(12) United States Patent
Torihara et al.

(10) Patent No.: US 6,412,969 B1
(45) Date of Patent: Jul. 2, 2002

(54) BACKLIGHTING DEVICE AND A METHOD OF MANUFACTURING THE SAME, AND A LIQUID CRYSTAL DISPLAY APPARATUS

(75) Inventors: Hiroshi Torihara; Kenichi Ukai; Nobuyuki Takahashi, all of Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/460,720

(22) Filed: Dec. 14, 1999

(30) Foreign Application Priority Data

Dec. 14, 1998 (JP) .......................................... 10-355223
Oct. 21, 1999 (JP) .......................................... 11-300261

(51) Int. Cl.$^7$ .............................. F21V 7/04; G01D 11/28
(52) U.S. Cl. .............................. 362/31; 362/27; 362/26; 349/62; 349/65
(58) Field of Search .................... 362/31, 19, 339, 362/27, 26; 349/65, 62; 359/487; 156/257; 385/146

(56) References Cited

U.S. PATENT DOCUMENTS

| 3,923,968 A | * | 12/1975 | Basque et al. | ............... | 423/611 |
| 4,805,984 A | * | 2/1989 | Cobb, Jr. | ................. | 350/96.28 |
| 5,422,756 A | * | 6/1995 | Weber | ......................... | 359/487 |
| 5,724,108 A | * | 3/1998 | Shibata | ......................... | 349/62 |
| 5,779,337 A | * | 7/1998 | Saito et al. | .................... | 362/31 |
| 5,779,339 A | * | 7/1998 | Konishi et al. | ............... | 362/31 |
| 5,957,561 A | * | 9/1999 | Ono et al. | ..................... | 362/31 |
| 6,001,210 A | * | 12/1999 | Ayres | .......................... | 156/257 |

FOREIGN PATENT DOCUMENTS

| JP | 8-166513 A | 6/1996 |
| JP | 9-5742 A | 1/1997 |
| JP | 9-197136 | 7/1997 |

\* cited by examiner

*Primary Examiner*—Sandra O'Shea
*Assistant Examiner*—Bao Truong
(74) *Attorney, Agent, or Firm*—Nixon & Vanderhye P.C.

(57) ABSTRACT

A backlighting device including: a light guide unit formed as a substantially flat panel of a first resin material having opposing surfaces and side faces, the light guide unit having a light guide section, wherein light enters the light guide unit through at least one of the side faces and is emitted from one of the opposing surfaces; and a light source element disposed adjacent to the at least one side face of the light guide section for irradiating light onto the at least one side face of the light guide section. The light guide unit further includes a light scattering section formed of a second resin material, the light scattering section substantially perpendicularly protruding from the at least one side face of the light guide unit, and the light scattering section overlies the light source element along a direction of travel of the light exiting from the light guide section so as to scatter the light irradiated by the light source element.

23 Claims, 17 Drawing Sheets

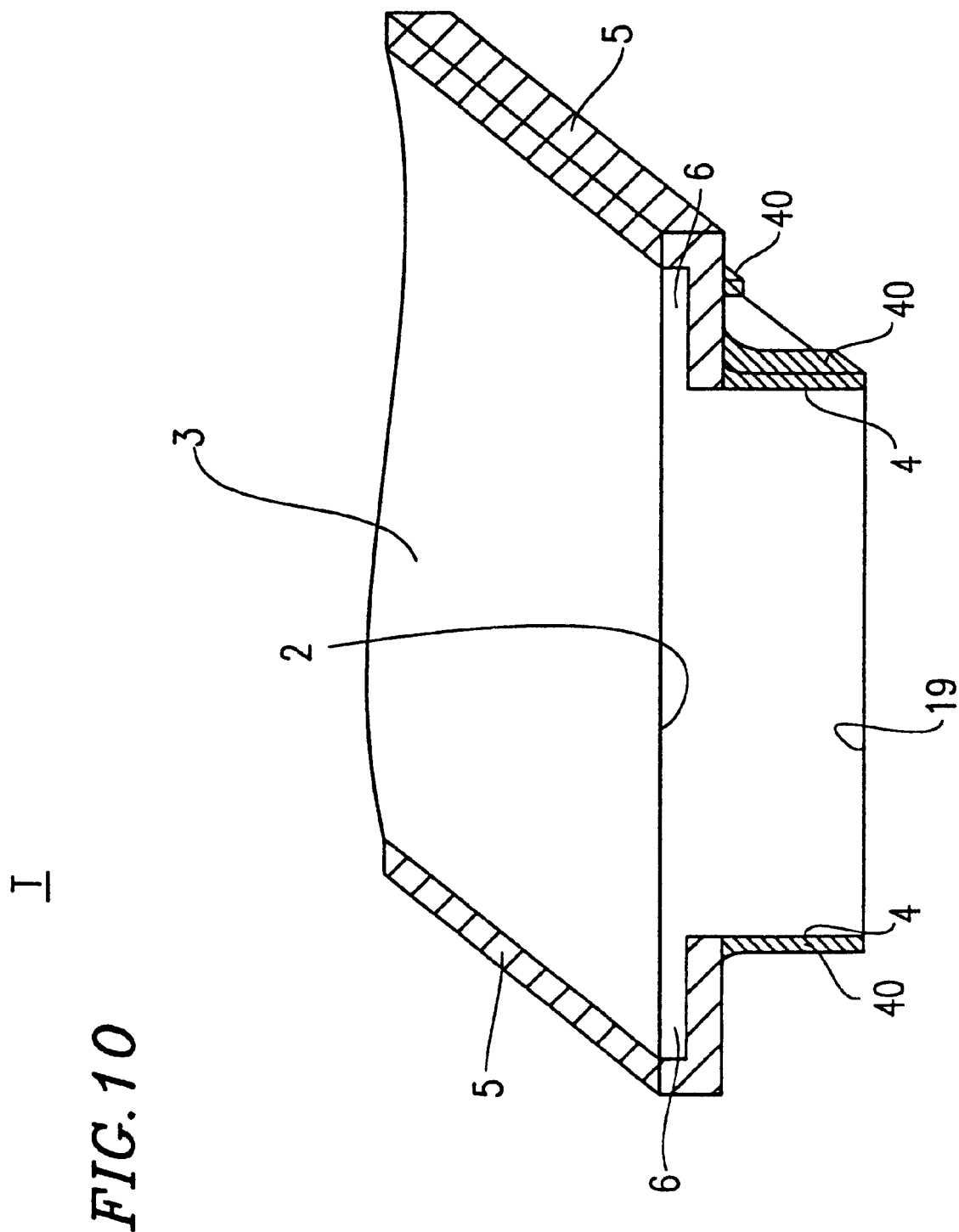

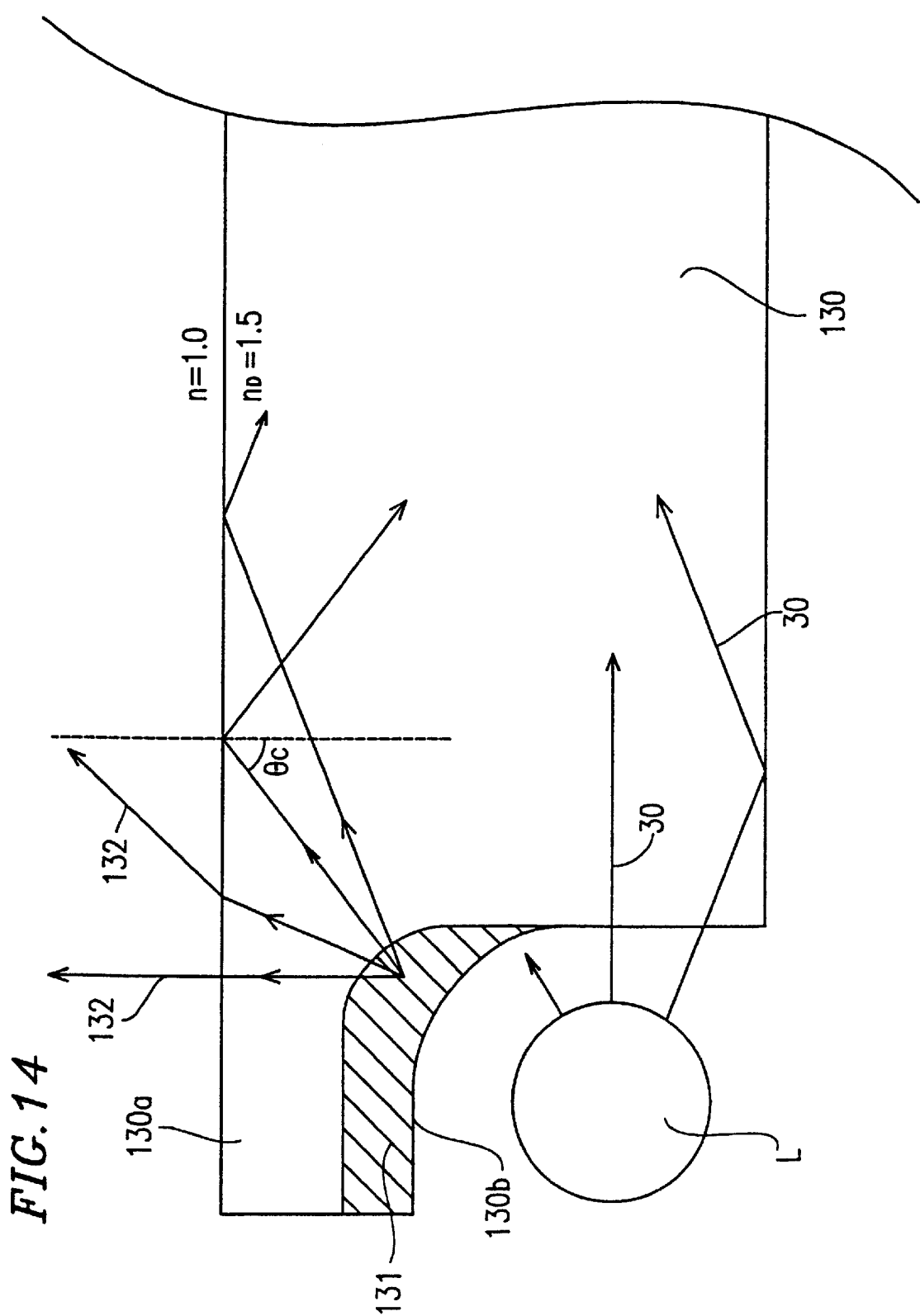

BACKLIGHTING DEVICE AND A METHOD OF MANUFACTURING THE SAME, AND A LIQUID CRYSTAL DISPLAY APPARATUS

BACKGROUND OF THE INVENTION

1. Field of the Invention

The present invention relates to a backlighting device and a method of manufacturing the same. More specifically, the present invention relates to an edgelight type backlighting device suitably used for a liquid crystal display apparatus and the like, and also relates to a liquid crystal display apparatus including the backlighting device.

2. Description of the Related Art

A class of backlighting devices for liquid crystal display apparatuses is generally known in which light generated from a capillary-like light source element (e.g., a cold cathode tube) disposed along a side face of a light guide unit enters into the light guide unit so as to be emitted through one face of the light guide unit. In such a backlighting device, the light source element and the light guide unit do not vertically overlay each other, enabling reduction of the size of the backlighting device along the thickness direction. In such a backlighting device, however, a space for disposing the light source element is required outside the light guide unit, which may become a dead space, i.e., a space which cannot be utilized as an effective viewing area, in a liquid crystal display apparatus incorporating such a backlighting device. Currently, there is an increasing need for an enlarged display area and a reduced module size, especially in on-vehicle liquid crystal display apparatuses and liquid crystal display apparatuses for mobile terminals.

Japanese Laid-open Publication No. 9-5742 discloses a relatively compact backlighting device having a structure shown in FIG. 12. The liquid crystal display apparatus 100 shown in FIG. 12 includes a liquid crystal panel 110, and a backlighting device 120 disposed under the liquid crystal panel 110. The backlighting device 120 includes a housing 122 for a light source element L, in the form of a notch provided in portion of each lateral end 121a of a light guide unit 121. The light source element L is disposed within the housing 122. A casing 123 covers the side faces and the bottom face of the light guide unit 121. A light diffusion panel 124 and a prism sheet 125 are provided between the upper face of the light guide unit 121 and the liquid crystal panel 110.

In the conventional backlighting device 120, the light guide unit 121 is composed of a transparent resin and includes a narrow portion 126 at each lateral edge 121a where the light guide unit 121 meets the upper face of the housing 122 for light source element. The narrow portion 126 is provided by mixing a particulate material that has a different refractive index into the transparent resin. Between the narrow portion 126 and the housing 122 for light source element, a light amount adjusting filter means 127 is formed. The disclosure of Japanese Laid-open Publication No. 9-5742 teaches that both the luminance unevenness and the color irregularity of the backlighting device 120 were eliminated by providing the light amount adjusting filter means 127 on the narrow portion 126 of the light guide unit 121.

As the light amount adjusting filter means 127, the following structures (1)–(4) are disclosed.

(1) a reflective PET film (thickness 188 microns), having apertures with diameters of 0.2 mm or less directly formed therein, where the aperture ratio is 12%.

(2) a reflective PET film (thickness 75 microns), with white ink dots being printed exclusively in a portion immediately above the light source element.

(3) a transmissive PET film with a thickness of 100 microns, bearing a dotted layer of aluminum deposited on one side thereof, where the aperture ratio is about 12%.

(4) a transmissive PET film with a thickness of 100 microns, bearing a dotted layer of aluminum deposited on both sides thereof, where the aperture ratio is about 10%.

If dot printing is used in the above-mentioned method disclosed in Japanese Laid-open Publication No. 9-5742, however, for example, problems may occur during the production of the backlighting device, such as unwanted variation in luminance and color caused by uneven printing and irregular ink distribution due to the abrasion of the silk screen (currently, a silk screen must be replaced after having been used for ten thousand shots). On the other hand, if aluminum layer deposition is used, there are problems such as changes in the dot shape caused by degradation of the deposition mask, chromaticity shifting due to the oxidation of the deposited aluminum layer, and peeling of layers due to insufficient adhesion to the PET sheet.

Furthermore, for producing the light amount adjusting filter means 127, some cost is incurred for, e.g., a dot printing machine, a vacuum deposition machine, and deposition jigs. Also, substantial cost is incurred that is associated with the abrasion of the machines and product inspection. Furthermore, the provision of the light amount adjusting filter means 127 on the narrow portion 126 of the light guide unit 121 may present serious cost problems associated with the cost for assembling, the cost for defects during the assembling due to defective parts or improper assembling, and the inspection cost.

Japanese Laid-open Publication No. 8-166513 discloses a light guide unit 130 as shown in FIG. 13A. A transmission adjusting section 131 is provided on the inner surface 130b of an extension 130a of the light guide unit 130 for adjusting the light transmittance. The transmission adjusting section 131 also has a light diffusion function. Japanese Laid-open Publication No. 8-166513 explains that linear advancement of the light from the light source element L and into the transmission adjusting section 131 is ensured because the inner surface 130b of the extension 130a of the light guide unit 130, which faces the light source element L, curves in accordance with the curve of the emission surface of the light source element L in the vicinity where the extension 130a merges into the rest of the light guide unit 130.

In accordance with the light guide unit 130 described in Japanese Laid-open Publication No. 8-166513 (see FIG. 13A), however, the light emitted from the light source element L creates light rays which are scattered over a wide range of angles within the light guide unit 130 at the curved portion of the transmission adjusting section 131, which is formed of white plastic. Therefore, in accordance with the light guide unit 130, as shown in FIG. 14, some of the light rays which have been scattered by the curved portion of the transmission adjusting section 131 and reached the upper face of the light guide unit 130 may have an acute incident angle with respect to the upper face of the light guide unit 130.

The critical incident angle ($\theta_a$) is obtained from the following formula according to Shell's law:

$$\theta_a = \sin^{-1} n/n_D.$$

Assuming that the refractive index n of the air is 1.0, and the refractive index $n_D$ of the light guide unit 130 is 1.5, the critical angle ($\theta_a$) is calculated to be about 42 degrees from the above formula. In this case, those light rays which strike the upper face of the light guide unit 130 with an incident angle larger than about 42 degrees are all reflected at the upper face of the light guide unit 130 back into the light guide unit 130. On the other hand, among those light rays with incident angles smaller than the critical angle ($\theta_a$), some are reflected at the upper face of the light guide unit 130 back into the light guide unit 130, while others may proceed straight through, or be refracted at, the upper face of the light guide unit 130. The light rays which have thus gone directly out of the light guide unit 130 create bright lines 132. Due to these bright lines 132, a different amount and/or direction of light may be obtained in regions of the upper face of the light guide unit 130 adjacent to the curved portion of the transmission adjusting section 131, as compared to the other regions of the upper face of the light guide unit 130.

As shown in FIG. 15, the luminance at the upper face of the light guide unit 130 is constant over the flat portion of the transmission adjusting section 131 (shown at the left end of FIG. 15), then increases over the vicinity of the curved portion due to the bright lines 132 directly going out from the transmission adjusting section 131, and decreases toward the center of the light guide unit 130 due to the total reflection occurring at the upper face.

When observing the upper face of the light guide unit 130, the viewing angle which produces the maximum luminance also differs between the flat portions and the curved portion of the transmission adjusting section 131. As shown in FIGS. 16A and 16B, at point A, where the transmission adjusting section 131 is flat, the highest luminance to obtained when the upper face of the light guide unit 131 is observed in a direction perpendicular to the upper face of the light guide unit 130. On the other hand, at point B, where the transmission adjusting section 131 is curved, the highest luminance is obtained when the light guide unit 130 is observed from the center of the light guide unit 130 toward the light source element L, i.e., when the viewing angle matches the outgoing angle of the bright lines 132.

Because these phenomena exist, when a backlighting device incorporating the light guide unit 130 and the light source element L is applied to a liquid crystal display apparatus, some luminance diversity may be observed along the light source element L when the edge portion (where the light source element L is provided) is viewed from the center of the liquid crystal display apparatus.

Also, due to the curved portion of the transmission adjusting section 131 covering the top of the light source element L, the light rays which should longitudinally enter the light guide unit 130 are also diffused by the transmission adjusting section 131. This reduces the utilization efficiency of the light from the light source element L, and thus the total luminance at the upper face of the light guide unit 130 is reduced. With reference to FIGS. 17A and 17B, the degree of luminance reduction which may be caused by the curved portion of the transmission adjusting section 131 which covers the top of the light source element L, and the luminance level which may be obtained by solving this problem, will be described.

In FIG. 17A, $D_1$ is an effective light guiding cross-sectional length (along the height direction) of the light guide unit 130 over which the light emitted from the light source element L directly enters the light guide unit 130 along the longitudinal direction without any luminance loss. $D_2$ is a semi-effective light guiding cross-sectional length (along the height direction) of the light guide unit 130 over which the light emitted from the light source element L is diffused by the transmission adjusting section 131 so as to cause some decrease in the luminance. $D_O$ represents an effective light guiding cross-sectional length (along the height direction) over which the light emitted from the light source element L can enter the light guide section 130 without any luminance loss in a hypothetical case where there is no luminance reduction of the light over the length indicated as the semi-effective light guide cross-sectional length $D_2$.

The luminance at the surface of the light guide unit 130 created by the light emitted from the light source element L is uniquely determined by the ratio of the effective light guiding cross-sectional length to the diameter of the light source element L. FIG. 17B is a graph representing the relationship between the luminance at the upper face of the light guide unit 130 and the ratio of the effective light guiding cross-sectional length to the diameter of the light source element L. The vertical axis of the graph represents relative luminance values at the surface of the light guide unit 130, where the luminance of the surface of the light guide unit 130 when the effective light guiding cross-sectional length is equal to the diameter of the light source element L is defined as 100%. The horizontal axis of the graph represents the ratio of the effective light guiding is cross-sectional length to the diameter of the light source element L. The luminance at the surface of the light guide unit 130 can be determined from this graph based on a sum total of its semi-effective light guiding cross-sectional length and the effective light guiding cross-sectional length.

In the light guide unit 130, the transmission adjusting section 131 formed of white plastic hinders the entrance of the light from the light source element L into the light guide unit 130. Therefore, it is assumed that the light amount per unit length which is introduced over the semi-effective light guiding cross-sectional length $D_2$ is less than 50% of the light amount per unit length which is introduced over the effective light guiding cross-sectional length $D_1$. Both the semi-effective light guiding cross-sectional length D2 and the effective light guiding cross-sectional length $D_1$ are of the same value, i.e., 1.5 mm. Thus, assuming that the light amount introduced over the semi-effective light guiding cross-sectional length $D_2$ is less than 50% of the light amount introduced over the effective light guiding cross-sectional length $D_1$, the total length for the effective light guiding cross-sectional length in the light guide unit 130 is about 2.3 mm. If the diameter of the light source element L is 2.4 mm, the ratio of the cross-sectional length for effective light to the diameter of the light source element is 0.96, by applying this value to the graph, the luminance at the surface of the light guide unit 130 is determined to be about 95%.

On the other hand, if the transmission adjusting section 131 did not interfere with the light entering the light guide unit 130, the light emitted from the light source element L would directly enter the light guide unit 130 along the longitudinal direction, without any luminance loss, over the effective light guiding cross-sectional length (along the height direction) $D_0$, which is 3.0 mm. In this case, the ratio of the effective light guiding cross-sectional length to the diameter of the light source element is 1.25. By applying this value to the graph, the luminance at the surface of the light guide unit 130 is determined to be about 120%.

Accordingly, by preventing the luminance reduction caused by the transmission adjusting section 131, the luminance at the surface of the light guide unit 130 can be improved by more than about 20%.

As described above, the light guide unit 130 has the problems of luminance diversity observed around the light source element L, and the decrease of the luminance in the light guide unit 130.

Furthermore, a light guide unit of a liquid crystal display apparatus is generally formed of acrylic resin having a heat distortion temperature of about 95° C. The peripheral area of the electrodes of light source element may rise up to about 100° C., at which temperature the resin material composing the light guide unit undergoes plastic deformation, causing light leakage at the peripheral portion of the frame of the backlighting device or misalignment of the optical sheet.

SUMMARY OF THE INVENTION

A backlighting device according to the present invention includes: a light guide unit formed as a substantially flat panel of a first resin material having opposing surfaces and side faces, the light guide unit having a light guide section, wherein light enters the light guide unit through at least one of the side faces and is emitted from one of the opposing surfaces; and a light source element disposed adjacent to the at least one side face of the light guide section for irradiating light onto the at least one side face of the light guide section, wherein the light guide unit further includes a light scattering section is formed of a second resin material, the light scattering section substantially perpendicularly protruding from the at least one side face of the light guide unit, and the light scattering section overlies the light source element along a direction of travel of the light exiting from the light guide section so as to scatter the light irradiated by the light source element.

In one embodiment of the invention, the first resin material is a transparent resin material.

In another embodiment of the invention, the second resin material contains a light scattering agent.

In still another embodiment of the invention, the light scattering section is arranged so as to be engaged with the at least one side face of the light guide unit.

In still another embodiment of the invention, the light scattering section is supported by a supporting section protruding integrally from the light guide section, the supporting section being formed of the first resin material.

In still another embodiment of the invention, the second resin material composing the light scattering section has heat resistance which is greater than heat resistance of the first resin composing the light guide section.

In still another embodiment of the invention, the second resin material composing the light scattering section contains about 2% to about 5% by weight of a light scattering agent.

In still another embodiment of the invention, a thickness t of the light scattering section and a total light transmittance T satisfy the formula:

$$10.1 \times EXP(-1.406t) \leq T \leq 56.3 \times EXP(-1.569t)$$

In still another embodiment of the invention, the light guide unit and the light scattering section are integrally formed by injection molding, the first resin material being different from the second resin material.

In still another embodiment of the invention, the second resin material composing the light scattering section after molding has a second contraction ratio, and the first resin material composing the light guide section after molding has a first contraction ratio, the first contraction ratio being different from the second contraction ratio.

In still another embodiment of the invention, the light scattering section and the light guide section are disposed so that the light scattering section clamps the light guide section due to a compressive stress created by a difference between a second contraction ratio of the second resin material composing the light scattering section after molding and a first contraction ratio of the first resin material composing the light guide unit after molding.

In still another embodiment of the invention, the aforementioned backlighting device further includes a rib provided on the at least one side face of the light guide section irradiated by the light from the light source element, the rib supporting a substantially perpendicular corner formed between the at least one side face and the light scattering section.

In still another embodiment of the invention, the rib is formed of the first resin.

In still another embodiment of the invention, the first resin material is a transparent resin material.

In still another embodiment of the invention, the backlighting device includes a plurality of ribs being spaced apart from one another by a distance in a range from about 3 mm to about 50 mm.

In still another embodiment of the invention, the backlighting device further includes at least one light diffusion plate on one of the opposing surfaces of the light guide unit through which the light from the light source element exits.

In still another embodiment of the invention, the backlighting device includes a second diffusion plate overlying the first diffusion plate, the second diffusion plate having a lower haze level than the first diffusion plate.

In another aspect of the invention, there is provided a liquid crystal display device incorporating any one of the aforementioned backlighting devices, wherein light emitted from the backlighting device is irradiated on a liquid crystal panel of the liquid crystal display device.

In yet another aspect of the invention, there is provided a method for manufacturing any one of the aforementioned backlighting devices, including the steps of: forming the light guide section by applying injection molding to the first resin; forming the light scattering section so as to be integral with the light guide section by applying injection molding to the second resin material contains a light scattering agent; and disposing the light source element so as to be adjacent to the light scattering section and the light guide section.

In one embodiment of the invention, the step for producing the light guide section includes forming a first engaging section, and the step for producing the light scattering section includes forming a second engaging section, the first engaging section of the light guide section being engaged with the second engaging section of the light scattering section.

In another embodiment of the invention, the step of forming the light guide section includes forming a rib on the at least one side face for supporting a substantially perpendicular corner formed between the at least one side face and the light scattering section.

Thus, the invention described herein makes possible the advantages of (1) providing a backlighting device which is suitable for mass production, with minimum luminance or color diversity; (2) a method for producing such a backlighting device; and (3) providing a liquid crystal display apparatus incorporating the backlighting device.

These and other advantages of the present invention will become apparent to those skilled in the art upon reading and understanding the following detailed description with reference to the accompanying figures.

BRIEF DESCRIPTION OF THE DRAWINGS

FIG. 10 is a perspective cross-sectional view of a light guide section having ribs provided on the side faces thereof.

FIG. 3B is a cross-sectional view showing light rays inside a light guide unit in a backlighting device according to the present invention.

FIG. 14 is a cross-sectional view showing bright lines generated at the upper face of a light guide unit in a conventional backlighting device.

DESCRIPTION OF THE PREFERRED EMBODIMENTS

Figure 1:
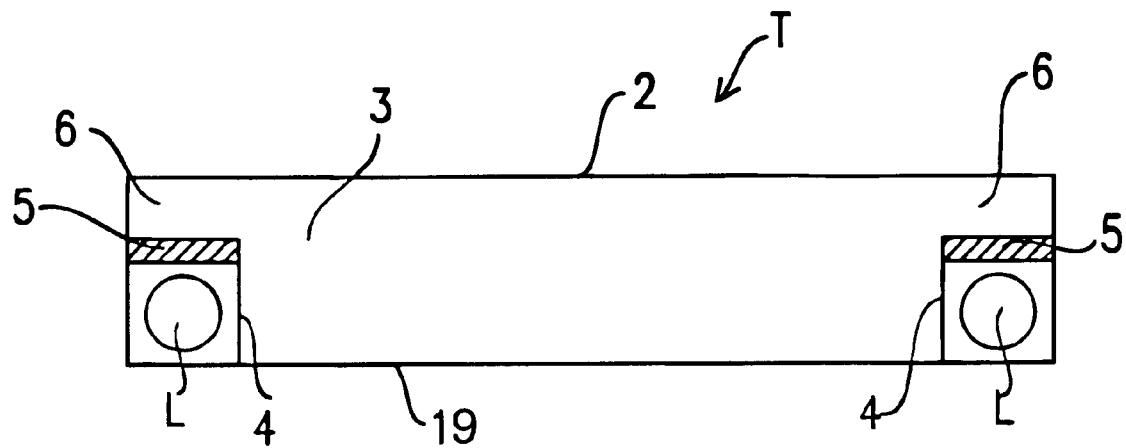
FIG. 1 is a cross-sectional view of a backlighting device according to the present invention.

FIG. 1 is a cross-sectional view showing a backlighting device according to the present invention. As shown in FIG. 1, the backlighting device 1 according to the present invention includes a light guide unit T having a flat-plate like light guide section 3 formed of a transparent resin, and a light source element L for irradiating the light guide unit T with light from the side faces 4 of the light guide unit T. The light enters the light guide section 3 from the side faces 4 and exits from the upper face 2. For the light source element L, a super-narrow cold cathode tube can be employed.

As used herein, a light guide unit T may have an "upper face", a "bottom face", and "side faces", without any distinction between the respective side faces. In other words, any face other than the "upper face" and the "bottom face" is defined as a "side face".

The light guide unit T includes the light guide section 3, a light scattering section 5, and a supporting section 6 for supporting the light scattering section 5. The light scattering section 5, which is formed of a resin containing a light scattering agent for scattering the light irradiated from the light source element L, overlies the light source element L along the direction of travel of the light exiting from the light guide section 3, so as to scatter the light irradiated from the light source element L before exiting at the upper face 2. The supporting section 6 is formed of a transparent resin, defining a protrusion (but an integral portion) of the light guide section 3. The light scattering section 5 and the supporting section 6 protrude substantially perpendicularly from the side faces 4. The protruding length of the light scattering section 5 and the light supporting section 6 from the side faces 4 is preferably about 4 mm.

As used herein, the term "substantially perpendicular angle" means an angle in the range from about 85 degrees to about 90 degrees. If the angle between the side face 4 and the light scattering section 5 (and the supporting section 6) falls within this range, substantially no undesirable influence is exerted on the passage of the light entering into the light scattering section 5 and the supporting section 6. Since the backlighting device 1 according to the present invention is preferably produced by the light guide section 3, the light scattering section 5, and the supporting section 6 formed by applying injection molding to a resin material using a metal mold, it is desirable that the angle of the corner formed between the side face 4 and the light scattering section 5 (and the supporting section 6) be in the range between about 85 degrees and 88 degrees in order to facilitate the removal of the light guide unit from the metal mold.

Figure 2:
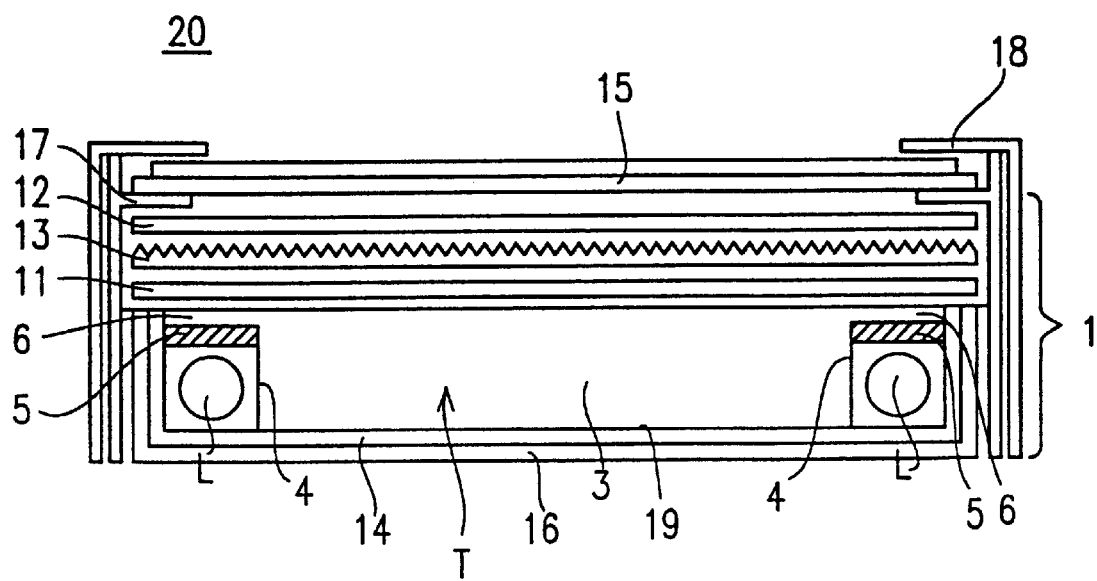
FIG. 2 is a cross-sectional view of a liquid crystal display apparatus incorporating a backlighting device according to the present invention.

FIG. 2 is a cross-sectional view of a liquid crystal display device incorporating the backlighting device 1 of FIG. 1. On the upper side of the light guide unit T where the light emitted from the light source element L exits, the backlighting device 1 includes, as necessary, diffusion sheets 11 and 12 for diffusing light, and a prism sheet 13 disposed between the diffusion sheets 11 and 12. The light guide unit T may also include a reflection sheet 14 for covering portions of the light guide unit T other than the upper face and for covering the light source element L.

As the diffusion sheets 11 and 12, a PET (polyethylene terephthalate) sheet with a thickness of about 130 microns and having diffusion particle coatings on both sides is preferably used. The prism sheet 13 preferably has a thickness of about 170 microns, and an apex angle of about 90 degrees. As the reflection sheet 14, a sheet formed of foamed PET with a thickness of about 188 microns is preferably used.

As necessary, the liquid crystal display device may further include: a casing 16 for accommodating the light source element L and portions of the light guide unit T other than the upper face in conjunction with the reflection sheet 14; frame 17 provided outside the casing 16 for holding the liquid crystal panel 15, the diffusion sheets 11 and 12, the prism sheet 13 and the backlighting device 1; and an upper bezel 18 provided outside the frame 17.

The casing 16 is preferably made of aluminum with a thickness of 0.7 mm. The frame 17 is preferably made of a conductive resin and the upper bezel 18 from stainless steel.

As the transparent resin material for the light guide section 3 of the light guide unit T, a light guide unit-grade material composed essentially of DELPET 80N (a clear acrylic material made by Asahi Chemical Industry Co., Ltd) maybe used. As the resin material for the light scattering section 5, a polycarbonate mixture may be used which is obtained by mixing a non-bromine flame-resistant reflective-grade material composed essentially of IUPILON HPR3000 or HPR3500 (hereinafter, simply referred to as a "reflective-grade material"), which includes a polycarbonate and powdered titanium oxide added therein as a scattering agent, and a clear-grade material composed essentially of a IUPILON product (hereinafter simply referred to as a "clear-grade material"). All of the aforementioned "IUPILON-" materials are made by Mitsubishi Engineering Plastic Co., Ltd.

The reason for using a polycarbonate mixture containing a reflective-grade material and a clear-grade material as the resin material for the light scattering section 5, is in order to reconcile the two conflicting requirements: inevitable thickness constraints for securing structural integrity of the resin material, and improvement of the total light transmittance of the resin-based light scattering section 5.

In order to form a reflective-grade material into a resin sheet, the resultant sheet must at least have a thickness t of about 0.5 mm. Because the amount of titanium oxide as a scattering agent contained in a reflective-grade material is predetermined by the manufacturer of the material, the light transmittance of the reflective-grade material is primarily controlled by the thickness of the structure which is formed of the reflective-grade material. Therefore, it is possible that, in the case where the thickness is more than the minimum thickness t of 0.5 mm which is required for forming the reflective-grade material into a resin sheet, a sufficient total light transmittance for the light scattering section 5 may not be obtained. Therefore, the present invention advantageously employs a polycarbonate mixture containing a reflective-grade material and a clear-grade material as the resin material for the light scattering section 5.

FIGS. 3A through 3F show a variety of possible configurations of the light scattering section 5 and the supporting section 6. In accordance with the light guide unit T shown in FIG. 3A, the effective viewing area of a liquid crystal display device incorporating this light guide unit T includes the supporting section 6 formed of a clear acrylic material and defining a protrusion integral with the light guide section 3. The light scattering section 5 provided at the outer edge and the bottom face of the supporting section 6 has a thickness of about 0.55 mm. The portion of the light scattering section 5 adjoining the outer edge of the supporting section 6 has a minimum thickness for structural rigidity. The structural rigidity is also enhanced by the clear acrylic material of the light guide section 3 and the polycarbonate of the light scattering section 5 contacting each other in a wide area.

Figure 4:
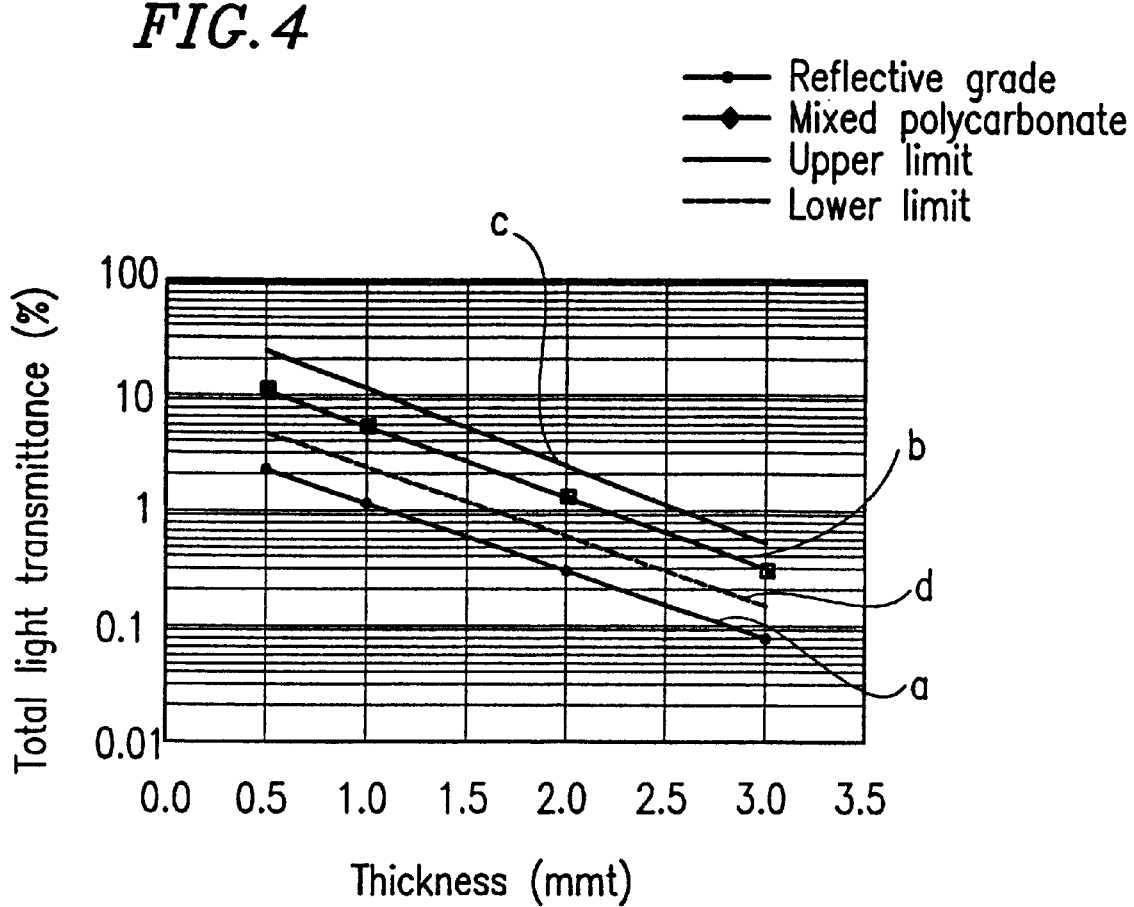
FIG. 4 is a graph showing the relationship between the thickness of the material forming a light scattering section and the total light transmittance.

FIG. 4 is a graph showing the relationship between the thickness and the total light transmittance of the light scattering section 5 in the case where the light scattering section 5 is made of a reflective-grade material alone. As shown with line a (♦—♦), when the light scattering section 5 is formed only of a reflective-grade material, the light scattering section 5 with a thickness t of 0.55 mm has a total light transmittance of about 2%, so that the light from the light source element L scarcely reaches the supporting section 6. With the light transmitted from the light scattering section 5 being only about 2%, the luminance in the outer periphery of the viewing area of the liquid crystal display device is too low to achieve the primary objective of equalizing the luminance of the entire light guide section 3.

In order to increase the total light transmittance of the light scattering section 5 while satisfying the thickness t requirement (i.e., more than about 0.5 mm) for forming a structurally integral resin sheet, it is necessary to decrease the percentage content of titanium oxide (included as a scattering agent) in the resin material forming the light scattering section 5. However, the percentage content of the titanium oxide in the commercially available reflective-grade material is fixed as mentioned above. Thus, the inventors found that the percentage content of the titanium oxide in the resin material forming the light scattering section 5 can be effectively decreased by mixing a clear-grade material into the reflective-grade material.

As a result of trying various mixing ratios between the reflective-grade material and the clear-grade material, the inventors found that the best luminance evenness for the entire light guide section 3 is obtained when titanium oxide is present in the amount of about 3.5% by weight in a polycarbonate mixture of a reflective-grade material and a clear-grade material. Line b (■—■) in the graph of the FIG. 4 represents the relationship between the total light transmittance and the thickness of the light scattering section 5 formed of a polycarbonate mixture containing about 3.5% by weight of titanium oxide.

As shown in FIG. 4, this polycarbonate mixture has a total light transmittance of about 10% when configured with a thickness t of 0.55 mm.

The optimal percentage content of titanium oxide is about 3.5% by weight as mentioned above However, the inventors also found that satisfactory results can be obtained in terms of the display quality of a liquid crystal display apparatus if the percentage content of titanium oxide falls within the range from about 2% by weight to about 5% by weight. If the percentage content of titanium oxide as a scattering agent is less than 2% by weight, the light transmitted from the light scattering section 5 into the light guide section 3 becomes too strong, thereby rendering the surrounding areas of the light source element L too bright, and thus creating bright lines. On the other hand, if the percentage content of titanium oxide as a scattering agent is more than 5% by weight, the light from the light scattering section 5 transmitted into the light guide section 3 becomes too weak, thereby rendering the surrounding areas of the light source element L too dark, and thus creating black lines.

In practice, however, care must be taken as to the following points in order to produce a polycarbonate mixture by mixing a reflective-grade material and a clear-grade material which includes about 3.5% by weight of a scattering agent.

First, the nominal amount of the scattering agent added to the reflective material may include an error of about 10%. Also, about 10% irregular localization is assumed to exist in the scattering agent included in the reflective-grade material, totaling to about ±20% fluctuation concerning the scattering agent alone. Furthermore, about ±20% fluctuation in the mixing ratio is expected when mixing together the two different materials, i.e., the reflective-grade material and the clear-grade material.

Therefore, in the polycarbonate mixture containing the reflective-grade material and the clear-grade material, approximately 64% (=80%×80%) to 144% (=120%×120%) manufacturing diversity is expected with regard to the scattering agent. For comparison, about ±20% diversity (i.e., from 120% to 80%) may exist in the case of obtaining a desired value of scattering agent content without mixing two different materials.

Thus, when mixing a reflective-grade material and a clear-grade material in order to theoretically obtain about 3.5% by weight scattering agent content, the actual amount of the scattering agent contained in the entire polycarbonate mixture and the amount of the scattering agent contained within local portions of the polycarbonate mixture are subject to some error.

Line b (■—■) in FIG. 4 shows the relationship between the preferable theoretical thickness t mm for obtaining an about 3.5% by weight scattering agent content and the resultant total light transmittance T % of the light scattering section 5. Line b (■—■) is represented by the following formula:

$$T=23 \times EXP(-1.466t)$$

On the other hand, when actually mixing a commercially available reflective-grade material and a clear-grade material to produce the light scattering section 5 with a 3.5% by weight scattering agent content, approximately 68% to 144% manufacturing diversity is expected with respect to the scattering agent content. By reflecting such error in T=23×EXP (−1.466t), $$10.1 \times EXP(-1.406t) \leq T \leq 56.3 \times EXP(-1.569t)$$

is obtained. This formula represents the relationship between the thickness t (mm) of the light scattering section 5 for optimizing the luminance evenness on the entire light guide section 3 and the total light transmittance T %, in the case where the light scattering section 5 is produced by actually mixing a commercially available reflective-grade material and a clear-grade material. As shown in the graph of FIG. 4, this relationship ranges between an upper limit denoted by the solid line c and a lower limit denoted by the dotted line d. In the optimal light scattering section 5, the relationship between the thickness t and the total light transmittance T is supposed to fall within this range. And the optimal range of the relationship between the thickness t of the light scattering section 5 and the total light transmittance T represented by the solid line c and the dotted line d in FIG. 4 is applicable to any one of the light guide unit T structures shown in FIGS. 3B through 3F, as well as the light guide unit T structure shown in FIG. 3A.

The polycarbonate mixture composing the light scattering section 5 has a load deflection temperature which is about 30° C. higher than that of the clear acrylic material composing the light guide section 3. The polycarbonate mixture also has a heat resistance of about 120° C., which is superior to the heat resistance of the clear acrylic material, which is about 90° C. Thus, the polycarbonate mixture will not undergo thermal deformation even when the temperature of the light guide unit T is elevated due to the heat emitted from the light source element L. As a result, the light scattering section 5 can maintain excellent structural as well as optical capacity.

Since the light scattering section 5 according to the present invention is formed of a resin material containing the light scattering agent as mentioned above, an inexpensive backlighting device which is suitable for mass production can be provided according to the present invention.

Although a polycarbonate mixture is used for the resin forming the light scattering section 5 in the illustrated embodiment, another material such as a Zeonex (Zonor) series (heat distortion temperature: about 110° C.) of Nippon Zeon Co., Ltd. may be used for forming the light scattering section 5. Selection of the resin material for forming the light guide unit T is essential to the improvement of the structural rigidity of the light guide unit T.

If the light scattering section 5 of the light guide unit T is formed of a material whose contraction ratio after injection molding is greater than that of the resin material forming the light guide section 3, compressive stress is created within the light scattering section 5. As a result, the highly contractive light scattering section 5, which is formed along the periphery of the light guide section 3, serves to clamp the light guide section 3, thereby providing rigidity to the structure of the light guide unit T. Note that the order of forming the light guide section 3 and the light scattering section 5 hardly affects the structural rigidity of the light guide unit T provided by the compressive stress within the light scattering section 5 according to the present embodiment because the light guide section 3 and the light scattering section 5 are molded before the resins have completely cooled down.

The contraction ratio for injection molding of the resin materials used for the present invention is from about 6/1000 to about 7/1000 for the light scattering section 5 formed of the aforementioned polycarbonate mixture, and about 3/1000 for the light guide section 3 formed of a clear acrylic material. Thus, the light scattering section 5 has a higher contraction ratio than that of the light guide section 3.

The bottom face 19 of the light guide section 3 of the light guide unit T preferably has an aventurine texture, so as to provide light scattering for uniform the luminance at the bottom face 19.

Figure 5:
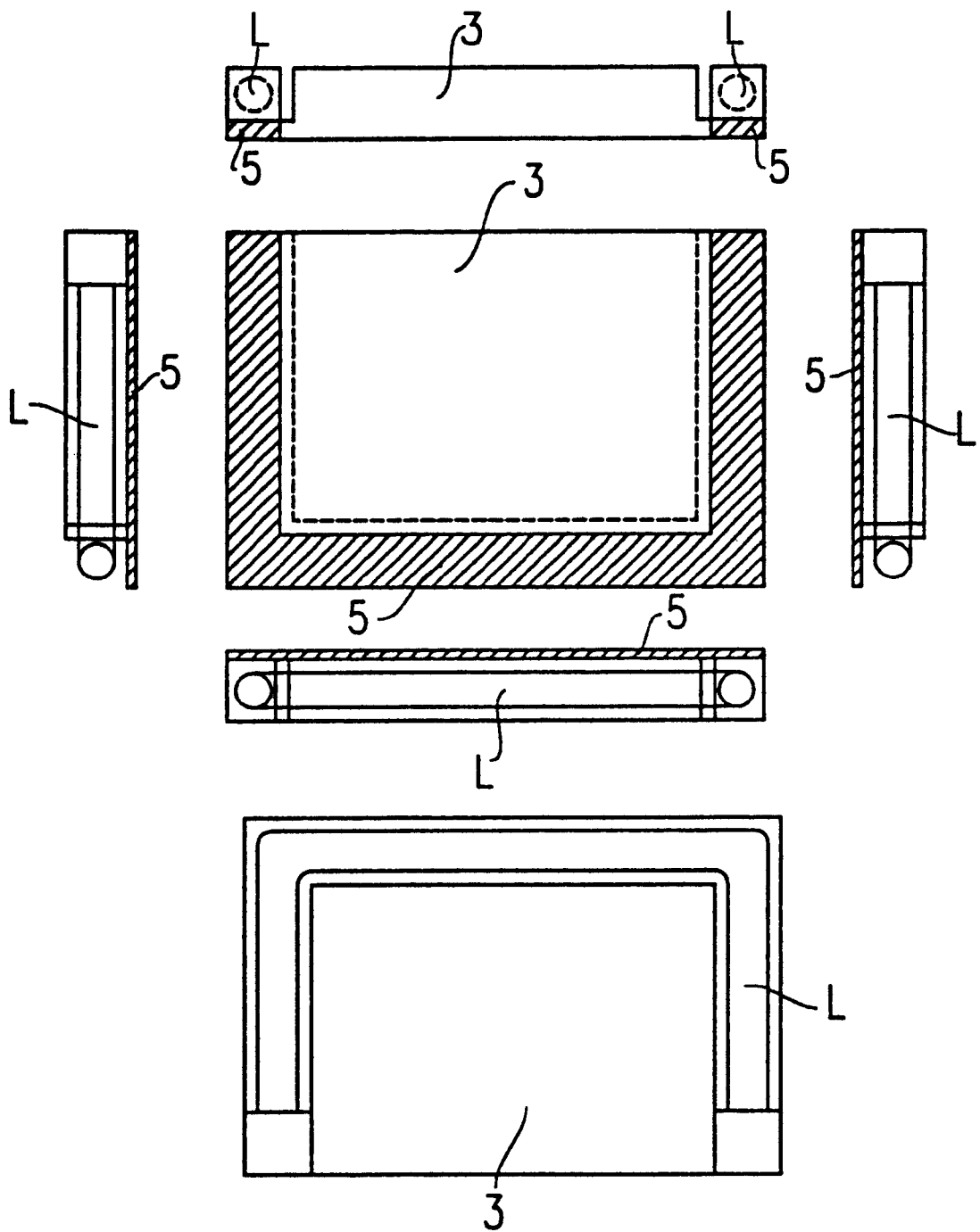
FIG. 5 is a six-sided exploded view of a backlighting device having a light source element of a "U" shape.
Figure 6:
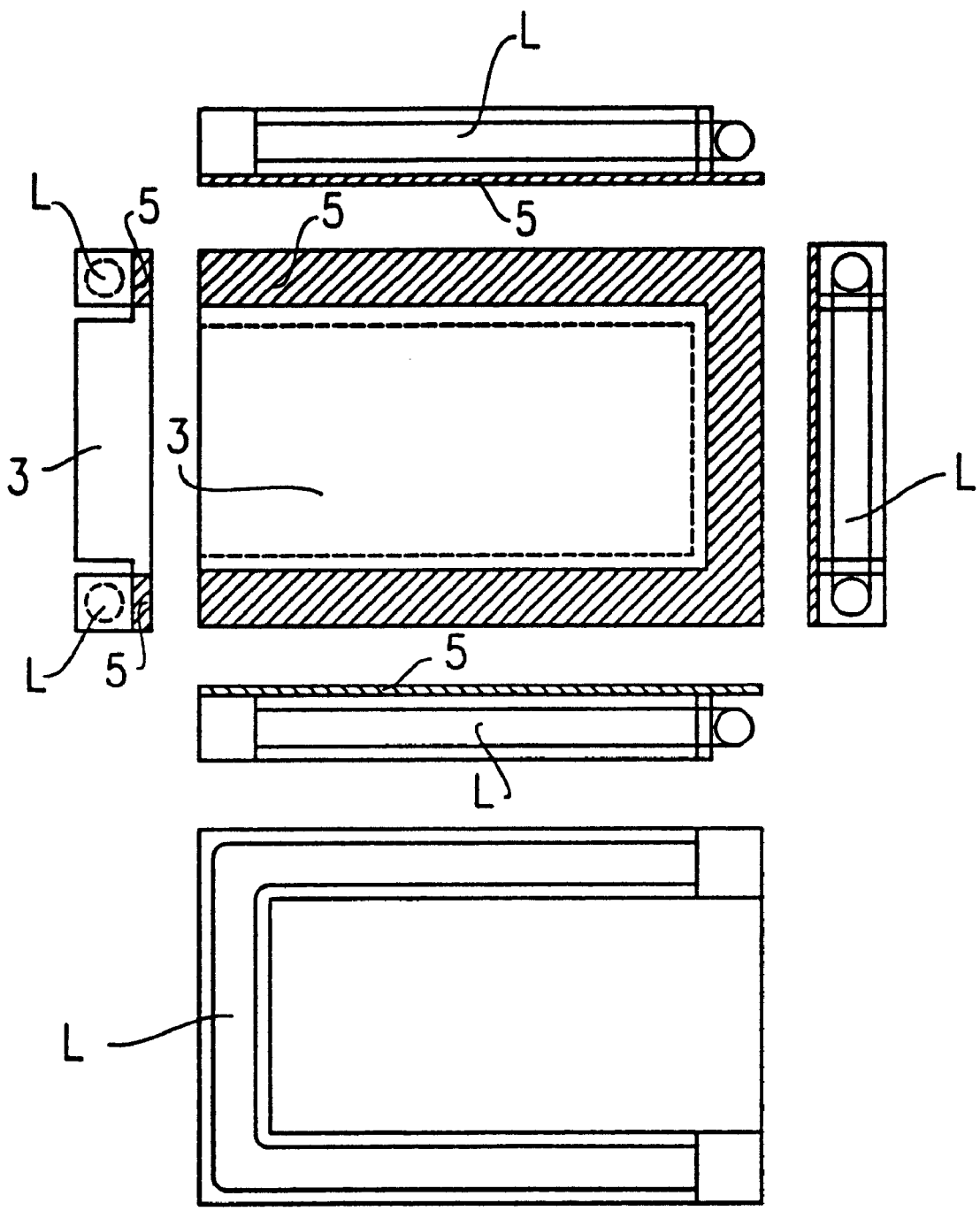
FIG. 6 is a six-sided exploded view of a backlighting device having a light source element of a "C" shape.
Figure 7:
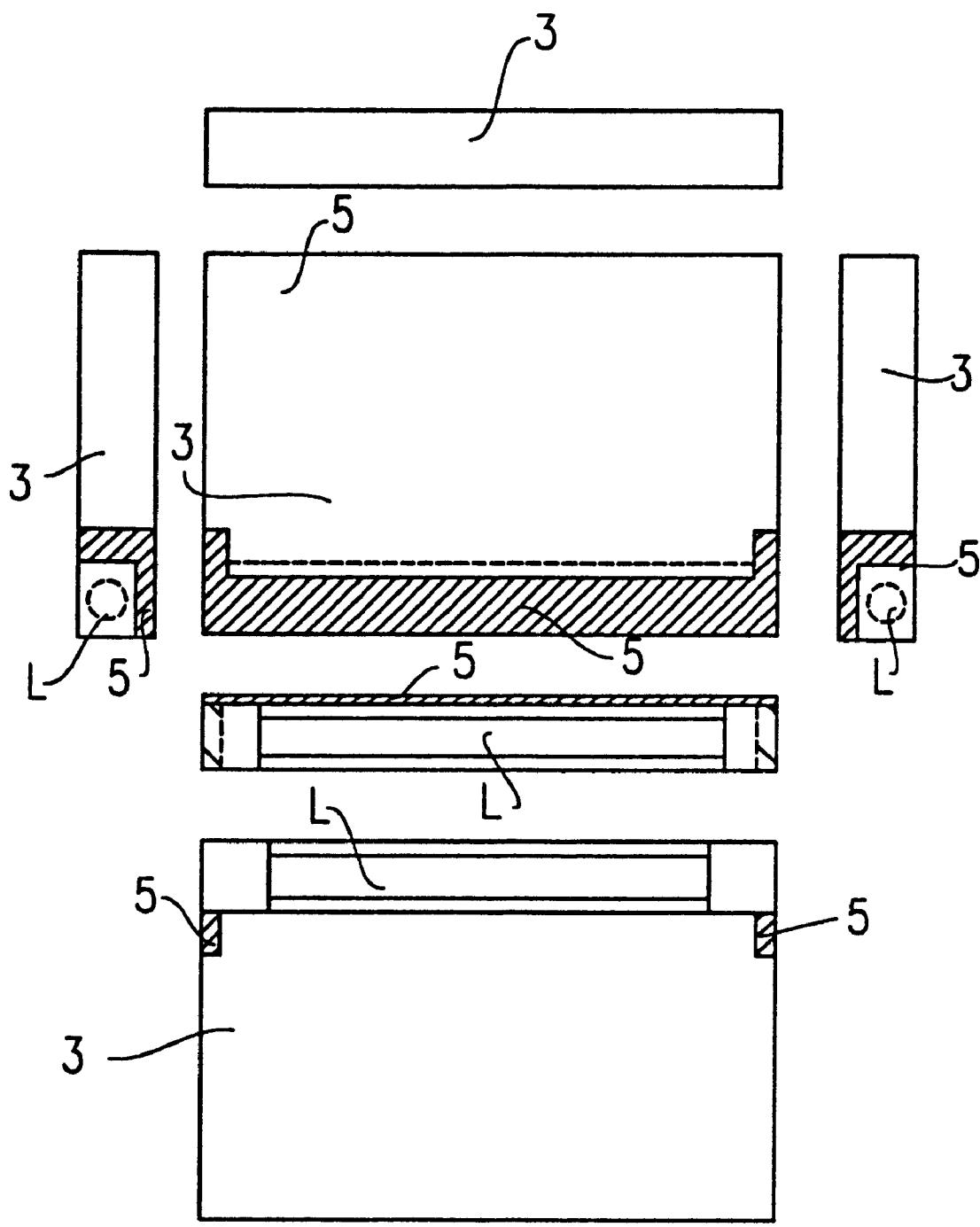
FIG. 7 is a six-sided exploded view of a backlighting device having the light source element with a single light source along one long side face.

The present invention is applicable to liquid crystal display apparatuses of various configurations. Three exemplary backlighting device configurations are schematically shown in FIGS. 5, 6 and 7. The embodiment shown in FIG. 5 includes a light source element L having a "U" shape light source element L which is provided along two short side faces and one long side face of the light guide unit T. The embodiment shown in FIG. 6 includes a light source element L having an reversed "C" shape which is provided along one short side face and two long side faces of the light guide unit T. The embodiment shown in FIG. 7 includes a linear-shaped light source element L which is provided only along one long side of the side faces 4 of the light guide unit T.

Note that FIGS. 5, 6, and 7 illustrate the light scattering section 5 in their preferable shapes for the respective light source element configurations. In the case of a "U" shape light source element L and a "C" type light source element L, as shown in FIGS. 5 and 6, the polycarbonate light scattering section 5 surrounds the clear acrylic light guide section 3 on three of its four side faces, thereby providing structural rigidity for the light scattering section 5, the light guide section 3, and the light source element L. However, in the case of the linear-shape light source element L which extends along only one long side of the light guide unit T, as shown in FIG. 7, the light scattering section 5 is provided along only that side of the light guide section 3, so that it is relatively difficult to provide structural stability for the light scattering section 5, the light guide section 3, and the light source element L. Therefore, in the embodiment incorporating a linear-shape light source element L, both edges of the light scattering section 5 are configured in an L shape against the light guide section 3 and the light source element L so as to achieve a large contact area as well as a three dimensional structure for obtaining sufficient structural rigidity.

Since the polycarbonate mixture has a high contraction ratio after injection molding, the light scattering section 5 formed of the polyearbonate mixture applies high compressive stress to the light guide section 3 due to contraction dfter injection molding. Therefore, the light scattering section 5 enhances the structural rigidity of the entire device, based not only on its physical configuration but also on the compressive stress it introduces. As a result, the vibration resistance and shock resistance of the entire device are greatly improved.

When manufacturing a backlighting device with a large surface area used for a large screen liquid crystal display, the light scattering section 5 disposed around the light guide section 3 may be divided so that the compressive stress created by the light scattering section 5 is dispersed accordingly.

A method of manufacturing the light guide unit T for incorporation in the backlighting device 1 according to the present invention will now be explained.

First, the light guide section 3 of the light guide unit T is formed by injection molding. Then, the metal mold corresponding to the light scattering section 5 is replaced by a Mold for forming the light scattering section 5. Then, the material is also switched from that for the light guide section 3, and the light scattering section 5 is formed by injection molding. Alternatively, the light scattering section 5 may be formed before forming the light guide section 3.

Thus, the light guide unit T according to the present invention is formed by a dichroic injection molding technique, which is within the skill of those in the art. Thus, the physical dimensions and optical characteristics of the light guide unit T according to the present invention, formed by using a dichroic injection molding technique, can be conserved for a long period of time, thereby minimizing any in stability associated with mass production.

Also, the light guide unit T according to the present invention, which can be formed by a dichroic injection molding, is free from many of the problems associated with the aforementioned conventional light guide unit having a light amount adjusting filter means, including the expenses incurred by dot printing machines, machine wear, product inspection, vacuum deposition machines, and jigs for deposition, or the assembling cost, equipment loss, and inspection cost required for positioning of a light amount adjusting filter means within the light guide unit. As a result, the manufacturing cost is greatly reduced.

Any additional cost that is incurred by the light guide unit T according to the present invention, other than producing a monochroic light guide unit, includes the cost for a dedicated metal mold for producing the light scattering section 5, cylinder equipment for injecting resin with a scattering agent contained therein, and the cost for the scattering agent-containing resin itself. Since an ordinary dichroic injection molding machine of ten includes multiple resin injection cylinders, there is no need to separately prepare a dedicated cylinder for injecting a scattering agent-containing resin, as mentioned above. Furthermore, scattering agent-containing resins are widely used for general purposes, and they are very cheap, some of them even cheaper than transparent resins. Thus, the additional cost incurred by using a scattering agent-containing resin, if at all, is extremely small.

One important element in the construction of the backlighting device 1 concerns the choice of the diffusion sheet 11 and/or diffusion sheet 12 (shown in FIG. 2). The diffusion sheet 11 and diffusion sheet 12 may be disposed so as to interpose the prism sheet 13 therebetween along the direction of light travel, in order to enhance luminance uniformity and chromaticity uniformity and to obtain wide viewing angle characteristics and high luminance. For the prism sheet 13, a product designated BEF (manufactured by Minnesota Mining and Manufacturing Co.) can be suitably used.

Figure 8:
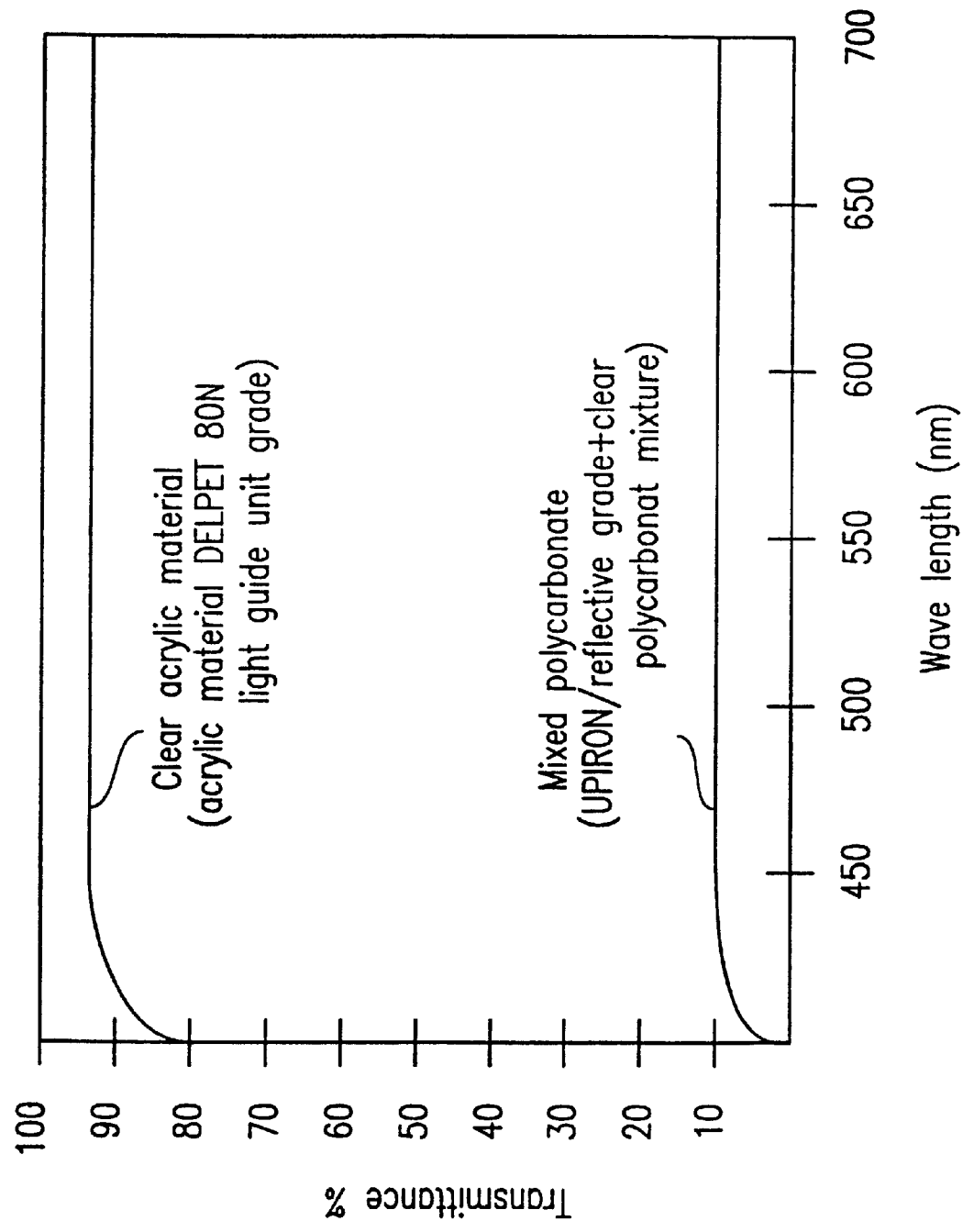
FIG. 8 is a graph showing the light transmission spectrum of a clear acrylic material and a polycarbonate mixture.

The wavelength (transmission spectrum) of the light transmitted through the clear acrylic material composing the light guide section 3 of the light guide unit T is different from the wavelength of the light transmitted through the polycarbonate mixture forming the light scattering section 5, as shown in FIG. 8. Therefore, even if the percentage content of the scattering agent in the polycarbonate mixture is adjusted so as to attain uniform luminance at the surface of the light guide unit T, including the supporting section 6, there may still be some noticeable difference in chromaticity. The chromaticity difference exhibits itself as color differentiation on the liquid crystal panel 15 of the liquid crystal display apparatus 20.

The chromaticity difference can be effectively eliminated by the diffusion sheet 11 provided on the upper face of the light guide unit T, as described below.

In general, as the degree of impurity (haze) within the diffusion sheet 11 is increased, the light transmittance of the diffusion sheet 11 is reduced so that more light is diffused by the diffusion sheet 11.

The term "haze" is a measure of the amount of diffused light which exits from the light-exiting surface of a sheet through which light passes. A material having a higher haze level has a higher impurity level, that is, it appears hazier. A material with a low haze level has a lower impurity level, that is, it appears more like transparent glass.

Increase in the amount of light diffused by the diffusion sheet 11 means an increase in the optical distance traveled by the light which enters the diffusion sheet 11, transmitted, and diffused, reaches the prism sheet 13. Accordingly, the light transmitted through the light scattering section 5 (which has a different chromaticity from the light transmitted through the light guide section 3) travels a greater distance for enhanced diffusion provided by the light diffusion sheet 11 (hence resulting in an increased optical distance). As a result, the aforementioned problem of chromaticity difference is eliminated.

Figure 9A:
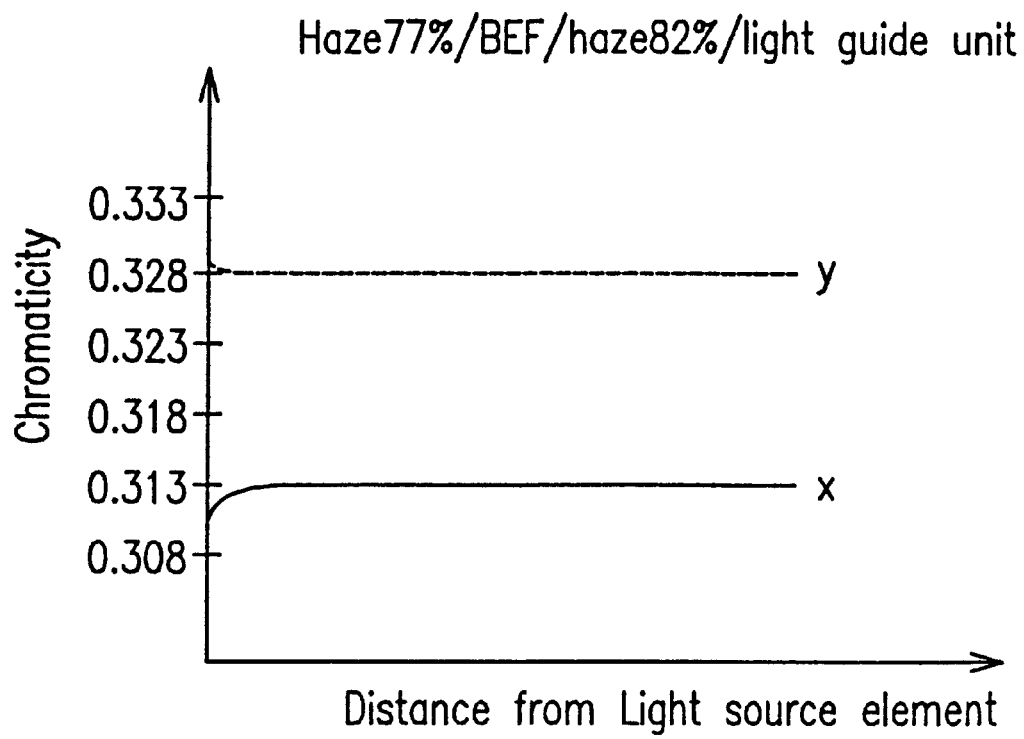
FIG. 9A is a graph showing the light luminance and chromaticity on the surface of a backlighting device, where a diffusion sheet disposed between a light guide unit and a prism sheet has a high haze level.
Figure 9B:
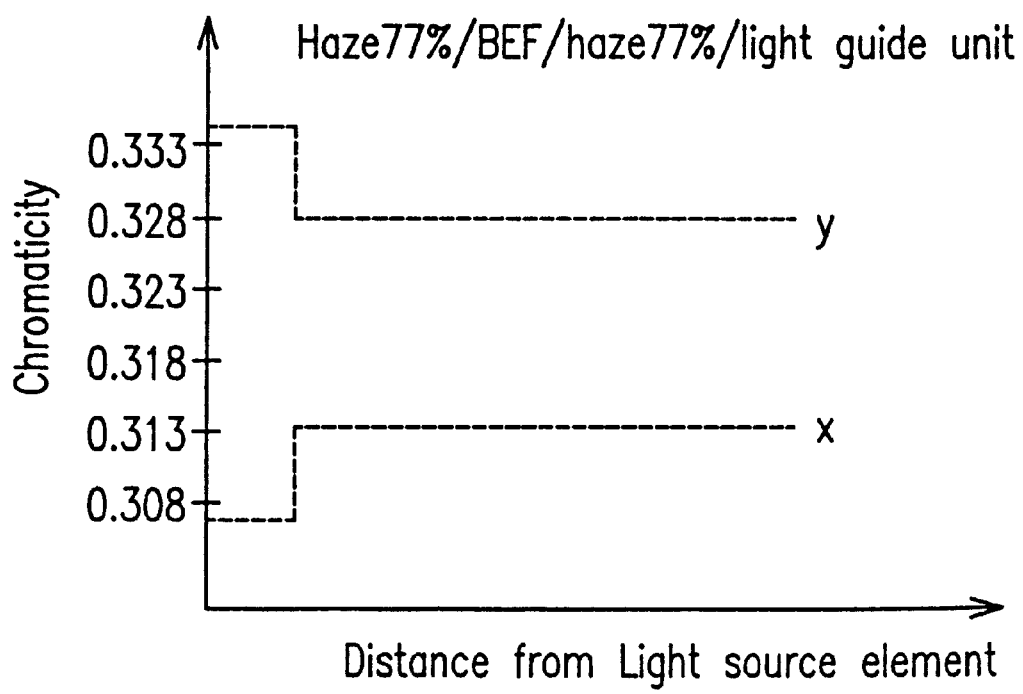
FIG. 9B is a graph showing the light luminance and chromaticity on the surface of the backlighting device, where a diffusion sheet disposed between a light guide unit and a prism sheet has a low haze level.

As the diffusion sheet 11 having a sufficiently high haze level for eliminating the aforementioned chromaticity difference, a variety of products can be used, e.g., D121 (about 78% haze), D118 (about 79% haze), D114 (about 81% haze), or D123 (about 82% haze), all manufactured by Tsujiden Co., Ltd., where the haze values were measured by using Model No. 1001DP by Nihon Denshoku Kogyo Co., Ltd. FIG. 9A shows the chromaticity distribution of the light irradiated on the liquid crystal panel 15 obtained when D120 (about 82% haze) is used for the diffusion sheet 11. FIG. 9B shows the chromaticity distribution obtained when D120 (about 77% haze) is used for the diffusion sheet 11. The results shown in FIGS. 9A and 9B were obtained by using D120 (about 77% haze) as the diffusion sheet 12 in order to prevent unwanted decrease in the luminance of the light irradiated on the liquid crystal panel 15.

In each of FIGS. 9A and 9B, the horizontal axis represents the distance on the surface of the diffusion sheet 12 from a point above light source element L toward the center of the backlighting device, and the vertical axis represents chromaticity. The solid line x represents x coordinate values, and the dotted line y represents y coordinate values in a Cartesian coordinate system representing a chromaticity diagram.

If the haze of the diffusion sheet 11 is low, as shown in FIG. 9B, both the luminance and the chromaticity drastically change at the border between the light scattering material 5 and the light guide section 3. On the other hand, if the haze of the diffusion sheet 11 is high, as shown in FIG. 9A, the luminance and the chromaticity change gradually.

A diffusion sheet having a higher haze level provides more enhanced light diffusion characteristics for better prevention of the luminance unevenness in the light scattering section 5 of the light guide unit T. Also, light which has been strongly diffused by a high-haze diffusion sheet can receive a maximum effect by the prism sheet for increasing the frontal luminance. In order to minimize the glare of the prism sheet observed at an oblique viewing angle without ruining the enhanced luminance provided by the prism sheet, it is preferable to use a diffusion sheet with a low haze level. Therefore, by providing the low-haze second diffusion sheet 12 above the first diffusion sheet 11 as mentioned above, the luminance unevenness of the light scattering section 5 of the light guide unit T and the glare of the prism sheet 13 observed at an oblique viewing angle can both be minimized.

Figure 13A:
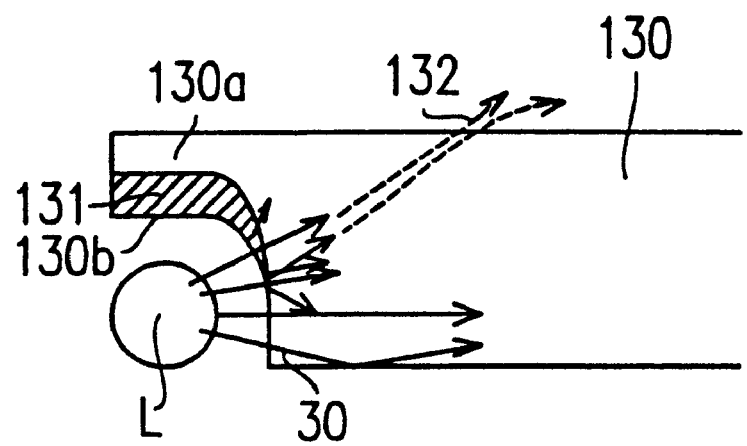
FIG. 13A is a cross-sectional view showing light rays within a conventional light guide unit in a backlighting device, where bright lines are generated.
Figure 13B:
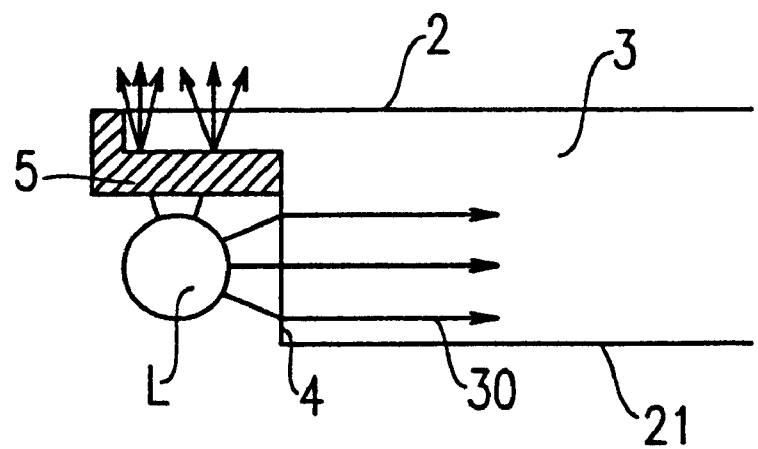
Figure 15:
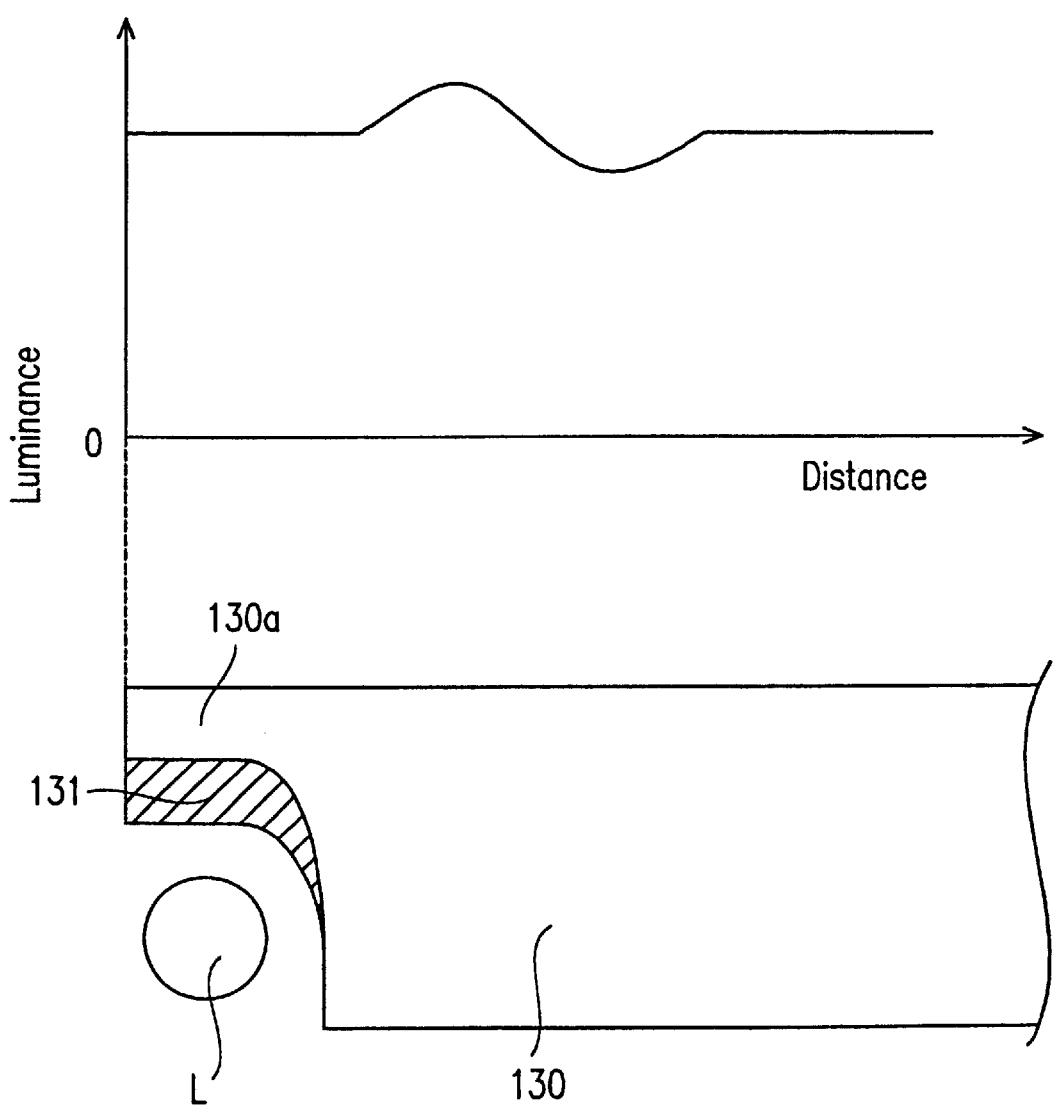
FIG. 15 is a diagram showing the irregularity of bright lines generated on the upper face of a light guide unit in a conventional backlighting device.
Figure 16A:
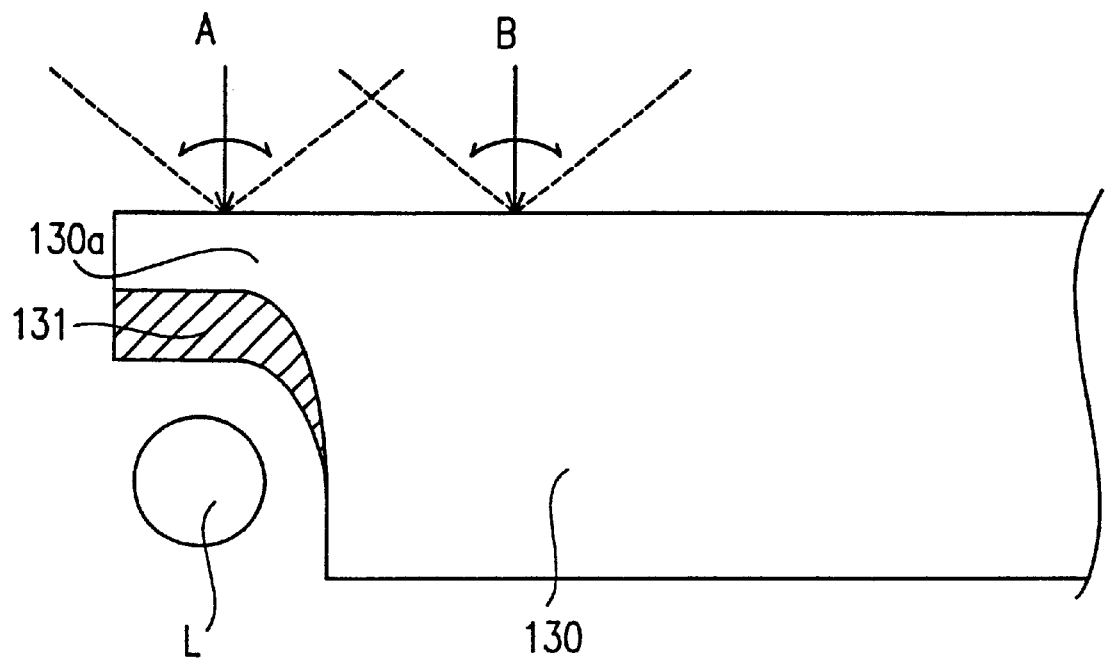
FIG. 16A is a cross-sectional view showing the viewing angles at the upper face of the light guide unit of a conventional backlighting device.
Figure 16B:
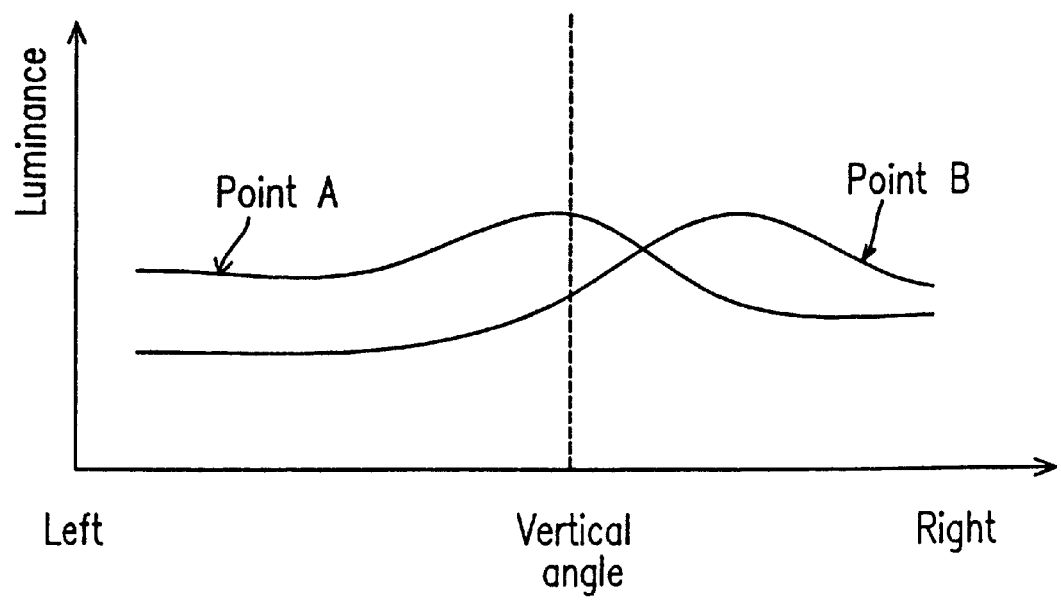
FIG. 16B is a diagram showing different relationships between the luminance peaks and the viewing angle, with respect to an observation point A and an observation point B, respectively.
Figure 17A:
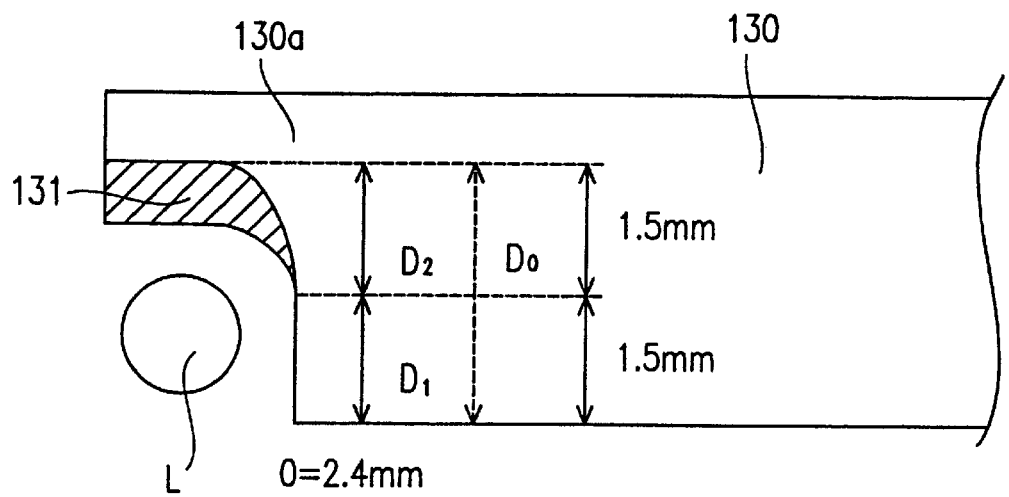
FIG. 17A is a cross-sectional view showing the degree of luminance reduction in a conventional backlighting device, where effective light guide cross-sectional lengths ($D_1$ and $D_0$) and a semi-effective light guide cross-sectional length ($D_2$) are illustrated.
Figure 17B:
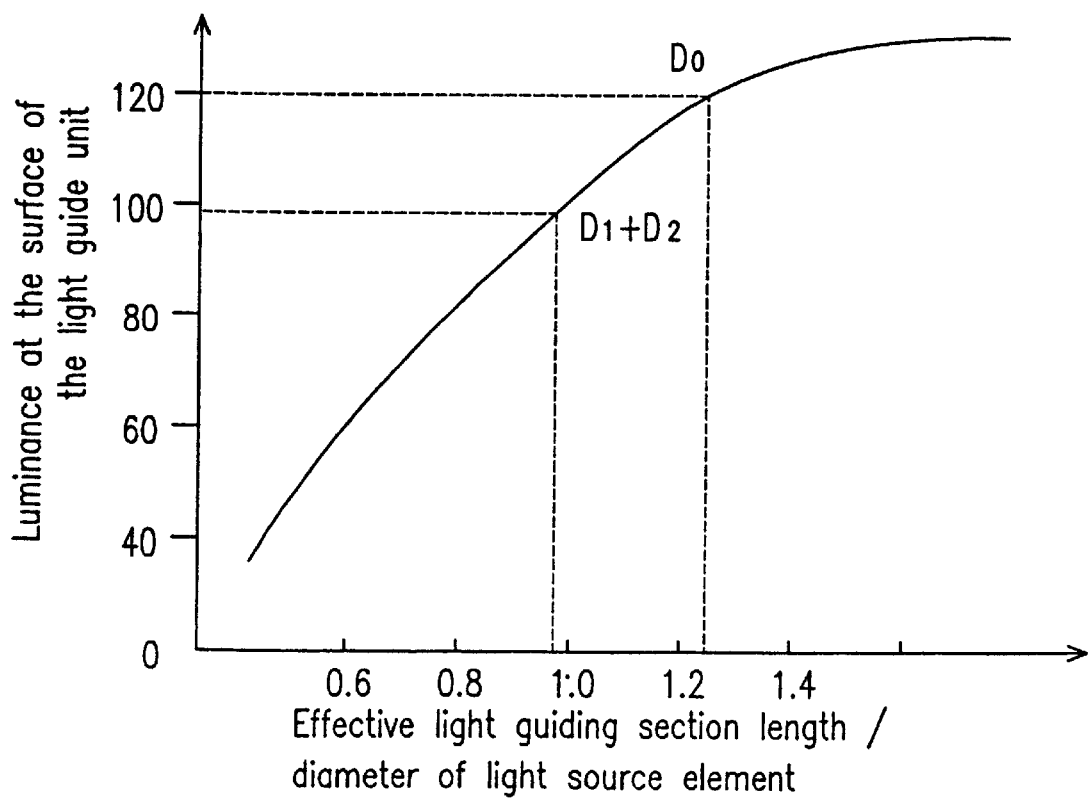
FIG. 17B is a graph showing the relationship between the luminance at the surface of the light guide unit and the ratio of an effective light guide cross-sectional length to the diameter of the light source element in a conventional backlighting device.

Now, the effects of the present invention will be graphically described with reference to FIGS. 13A and 13B. Referring to FIG. 13B, the light guide unit T for a backlighting device according to the present invention which includes the light scattering section 5 and the supporting section 6 substantially perpendicularly protruding from the side 4 to the upper face of the light source element L, effectively allows the light emitting from the light source element L to be scattered by the light scattering section 5. Thus, the light guide unit T according to the present invention prevents the generation of bright lines. For comparison, FIG. 13A (discussed in the BACKGROUND) shows a light guide unit 130 of Japanese Laid-open Publication No. 8-166513, where bright lines 132 are generated from the light guide unit 130. Thus, in accordance with the light guide unit T of the present invention, the light from the light source element L does not directly go out from the upper face 2 of the light guide unit T, so that the direct light 30 from the light source element L can be introduced into the light guide unit T while maintaining high luminance without attenuation. Also, according to the present invention, a substantially even luminance distribution can be achieved by adding an appropriate amount of titanium oxide as a scattering agent to a resin material, such as polycarbonate, which compose the light scattering section 5 of the light guide unit T.

The luminance distribution of the liquid crystal display apparatus 20 incorporating the backlighting device 1 having the light guide unit T according to the present invention was measured in the following manner. As an inverter, HIU-288 by HARISON ELECTRIC CO., LTD. was used, and a current of 6.5mArms was allowed to flow in a super-narrow cold cathode tube used as the light source element L. The measurements were taken 15 minutes after the fluorescent tube was lighted. The ambient temperature was about 25° C.

The luminance measurements showed an ideal luminance level of about 380 cd/m$^2$ in the central part of the liquid crystal panel, as well as an ideal luminance level of about 375 cd/mm$^2$ in the peripheral area of the liquid crystal panel. As for the chromaticity on the liquid crystal panel, the chromaticity at the center of the liquid crystal panel read: x=0.313 and y=0.329, whereas the chromaticity at the peripheral portion of the liquid crystal panel read: x=0.314 and y=0.330, which is slightly higher than the central chromaticity. However, the measured peripheral chromaticity was well within the bounds of the module chromaticity specifications, and no substantial change in color was observed by visual inspection.

FIGS. 3A to 3F are cross-sectional views showing several light guide units T which were actually developed by the inventors. It will be appreciated that the configurations shown in FIGS. 3A to 3F are only exemplary, and the light guide unit T of the present invention is also applicable to configurations other than those shown in FIGS. 3A to 3F.

Each of FIGS. 3A to 3F illustrates a structure in which the supporting section 6 and the light scattering section 5 are engaged with each other, which improves the structural rigidity of the light guide section 3.

Figure 3A:
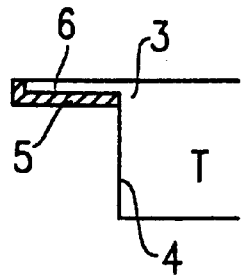
FIGS. 3A through 3F are cross-sectional views showing an exemplary configuration of a supporting section and a light scattering section of a light guide unit according to the present invention.
Figure 3D:
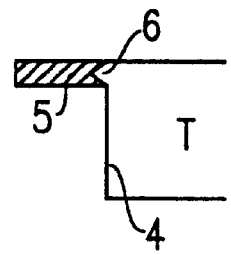
Figure 3B:
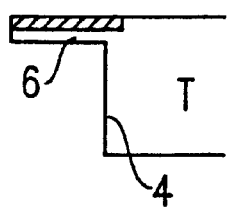
Figure 3E:
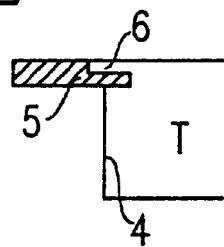
Figure 3C:
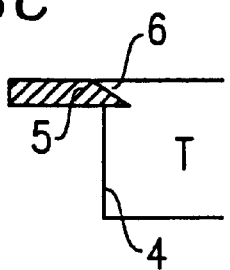
Figure 3F:
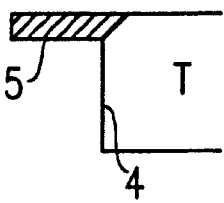

In the light guide unit T in FIG. 3A, the light scattering section 5 directly faces the light source element L below the supporting section 6 substantially perpendicularly protruding from the side face 4. In the light guide unit T in FIG. 3B, the light scattering section 5 is provided on the upper surface of the supporting section 6 substantially perpendicularly protruding from the side face 4. In the light guide units T in FIGS. 3C to 3F, the light scattering section 5 defines virtually all of the portion substantially perpendicularly protruding from the side face 4, the light scattering section 5 being engaged with the supporting section 6 provided on the side face 4.

In accordance with the configurations of the light guide section T shown in FIGS. 3A–3F, the light from the light source element L is appropriately scattered by the light scattering section 5 immediately overlying the light source element L for reducing luminance. As a result, uniform luminance can be obtained within the light guide section 3.

In the manufacturing process of the light guide unit T, it is preferable to produce the light guide section 3 prior to the light scattering section 5. This is because the manufacturing cost can be reduced by producing the light guide section 3 which has a greater volume than the light scattering section 5.

As shown in FIG. 10, a plurality of ribs 40 can be provided at the side face 4 for further supporting the substantially perpendicular protrusion 6 from the side face 4 of the light guide unit T and the light scattering section 5. Each of the ribs 40, which is preferably formed of the same acrylic resin as that of the light guide section 3 of the light guide unit T, has a gradually increasing thickness from a bottom face 19 toward the upper face 2 of the light guide unit T. The preferable dimensions of the rib 40 are as follows: about 3.5 mm height from the bottom face 19 to the upper face 2 of the light guide unit T: about 1 mm thickness at the bottom face 19; and about 1.5 mm thickness at the upper face 2. The distance between adjacent ribs 40 is preferably from about 3 mm to about 50 mm. Furthermore, when employing the U or C-shape light source element L shown in FIGS. 5 and 6, it is preferable to provide with ribs 40 on all of the side faces 4 of the light guide unit T which are irradiated by the light source element L. In the case of the U-shape configuration shown in FIG. 11, a total of ten ribs are provided at the three side faces 4.

In the peripheral area of the electrodes of the light source element L, the temperature may rise up to about 100° C. due to the heating of the light source element L. Since the heat distortion temperature of the acrylic resin forming the ribs 40 is about 90° C., it is preferable to provide an air layer between the ribs 40 and the light source element L as an insulating layer, so as to prevent the deformation or yellowing of the ribs 40.

Since the ribs 40 are formed of transparent acrylic resin, the light from the light source element L is not scattered or absorbed by the ribs 40. Therefore, the ribs 40 do not introduce substantial decrease in the luminance.

The ribs 40 can be formed during the manufacturing steps for the light guide section 3, by forming corresponding notches in the metal mold for the light guide section 3 of the light guide unit T, and injecting the transparent resin. After that, the light scattering section 5 is formed by injecting the aforementioned scattering agent-containing resin, thus forming the light guide unit T with the ribs 40 provided thereon.

Figure 11:
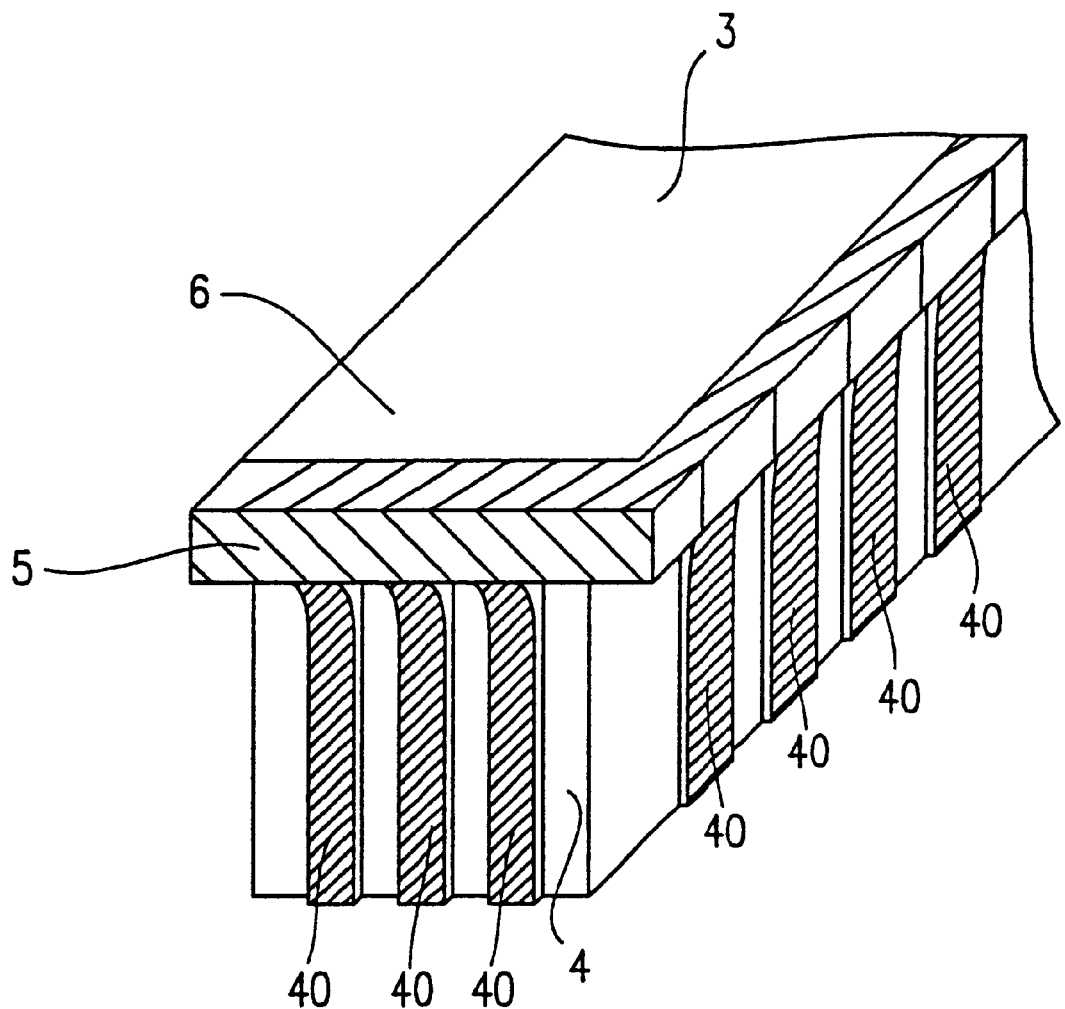
FIG. 11 is a perspective view of a light guide section used for a backlighting device incorporating a "C" shape light source element, where the light guide section has ribs provided on the side faces thereof.
Figure 12:
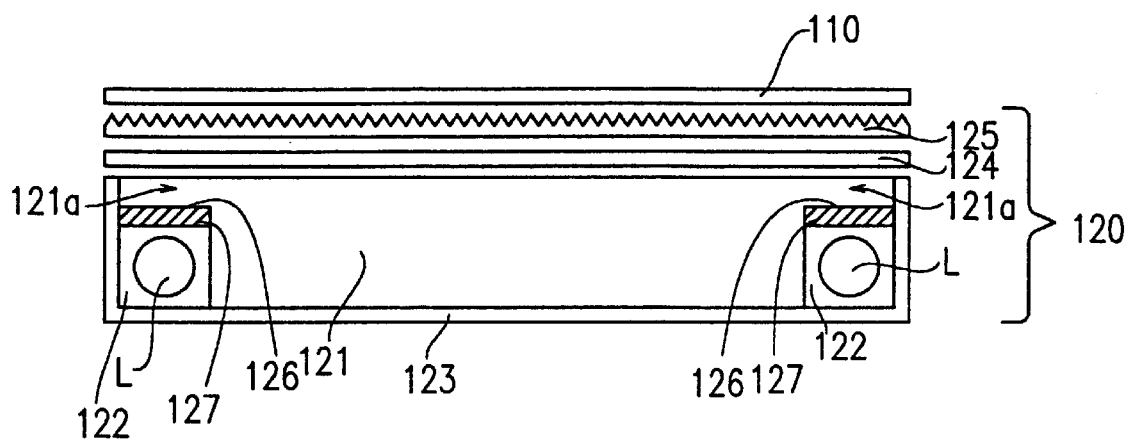
FIG. 12 is a cross-sectional view of a conventional backlighting device.

As shown in the FIGS. 10 and 11, the ribs 40 on the light guide section 3 provide further support for the substantially perpendicular corner between the side face 4 of the light guide section 3 and the light scattering section 5 protruding from the side face 4, whereby the structural rigidity and the shock resistance of the device can be improved.

As described above, according to the present invention, it is possible to provide a heat-resistant backlighting device which is suitable for mass production at a relatively low cost because no special equipment is needed for manufacturing other than the equipment required for injection molding of resins, and in which the unevenness of the luminance and the chromaticity is suppressed. According to the present invention, there is also provided a method for manufacturing such a backlighting device and a liquid crystal display apparatus incorporating the backlighting device.

Furthermore, the rigidity and the shock resistance of the device can be further improved by providing ribs 40 on the light guide section 3 of the light guide unit T in the backlighting device.

The backlighting device according to the present invention can be suitably used for an on-vehicle liquid crystal display apparatus, a liquid crystal display apparatus for a mobile terminal, a liquid crystal display apparatus for entertainment purposes, a liquid crystal display apparatus for AV (audio-video) applications, and a liquid crystal display apparatus for FA (factory automation) applications.

Also, the present invention enables enlargement of a display region with a minimum module size.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A backlighting device comprising:
a light guide unit formed as a substantially flat panel of a first resin material having opposing major surfaces and side faces, the light guide unit having a light guide section, wherein light enters the light guide unit through at least one of the side faces and is emitted from at least one of the opposing major surfaces;
a light source element disposed adjacent to the at least one side face of the light guide section for irradiating light onto the at least one side face of the light guide section,
wherein the light guide unit further includes a light scattering section comprising a second resin material, the light scattering section substantially perpendicularly protruding from the at least one side face of the light guide unit, and wherein the light scattering section overlies the light source element so as to scatter the light irradiated by the light source element;
wherein said second resin material includes a light scattering agent comprising fine particles of $TiO_2$; and
wherein the second resin material in the light scattering section contains about 2% to about 5% by weight of the light scattering agent.

2. The backlighting device according to claim 1, wherein the first resin material is a transparent resin material.

3. The backlighting device according to claim 1, wherein the light scattering section is arranged so as to be engaged with the at least one side face of the light guide section.

4. The backlighting device according to claim 1, wherein the light scattering section is supported by a supporting section protruding integrally from the light guide section, the supporting section comprising the first resin material.

5. The backlighting device according to claim 1, wherein the second resin material comprised in the light scattering section has heat resistance which is greater than heat resistance of the first resin comprised in the light guide section.

6. A backlighting device comprising:
a light guide unit formed as a substantially flat panel of a first resin material having opposing major surfaces and side faces, the light guide unit having a light guide section, wherein light enters the light guide unit through at least one of the side faces and is emitted from at least one of the opposing major surfaces;
a light source element disposed adjacent to the at least one side face of the light guide section for irradiating light onto the at least one side face of the light guide section, wherein the light guide unit further includes a light scattering section comprising a second resin material, the light scattering section substantially perpendicularly protruding from the at least one side face of the light guide unit, and wherein the light scattering section overlies the light source element so as to scatter the light irradiated by the light source element;
wherein said second resin material includes a light scattering agent comprising fine particles of $TiO_2$; and
wherein a thickness t of the light scattering section and a total light transmittance T satisfy the formula:

$$10.1 \times EXP(-1.406t) < x < 56.3 \times EXP(-1.569t).$$

7. The backlighting device according to claim 1, wherein the light guide unit and the light scattering section are integrally formed by injection molding, the first resin material being different from the second resin material.

8. The backlighting device according to claim 1, wherein the second resin material comprised in the light scattering section after molding has a second contraction ratio, and the first resin material comprised in the light guide section after molding has a first contraction ratio, the first contraction ratio being different from the second contraction ratio.

9. The backlighting device according to claim 1, wherein the light scattering section and the light guide section are disposed so that the light scattering section clamps the light guide section due to a compressive stress created by a difference between a second contraction ratio of the second resin material comprised in the light scattering section after molding and a first contraction ratio of the first resin material comprised in the light guide unit after molding.

10. A backlighting device comprising:
a light guide unit formed as a substantially flat panel of a first resin material having opposing major surfaces and side faces, the light guide unit having a light guide section, wherein light enters the light guide unit through at least one of the side faces and is emitted from at least one of the opposing major surfaces;
a light source element disposed adjacent to the at least one side face of the light guide section for irradiating light onto the at least one side face of the light guide section, wherein the light guide unit further includes a light scattering section comprising a second resin material, the light scattering section substantially perpendicularly protruding from the at least one side face of the light guide unit, and wherein the light scattering section overlies the light source element so as to scatter the light irradiated by the light source element;

wherein said second resin material includes a light scattering agent comprising fine particles of $TiO_2$; and a rib provided on the at least one side face of the light guide section irradiated by the light from the light source element, the rib supporting a substantially perpendicular corner formed between the at least one side face and the light scattering section.

11. The backlighting device according to claim 10, wherein the rib comprises the first resin.

12. The backlighting device according to claim 11, wherein the first resin material is a transparent resin material.

13. The backlighting device according to claim 10, wherein the backlighting device comprises a plurality of ribs being spaced apart from one another by a distance in a range from about 3 mm to about 50 mm.

14. The backlighting device according to claim 1, further comprising at least one light diffusion plate on one of the opposing surfaces of the light guide unit through which the light from the light source element exits.

15. The backlighting device according to claim 14, wherein the backlighting device includes a second diffusion plate overlying the first diffusion plate, the second diffusion plate having a lower haze level than the first diffusion plate.

16. A liquid crystal display device incorporating the backlighting device according to claim 1, wherein light emitted from the backlighting device is irradiated on a liquid crystal panel of the liquid crystal display device.

17. A method for manufacturing the backlighting device according to claim 1, comprising the steps of:
    forming the light guide section by applying injection molding to the first resin;
    forming the light scattering section so as to be integral with the light guide section by applying injection molding to the second resin material comprising a light scattering agent; and
    disposing the light source element so as to be adjacent to the light scattering section and the light guide section.

18. The method for manufacturing a backlighting device according to claim 17, wherein the step for producing the light guide section comprises forming a first engaging section, and the step for producing the light scattering section comprises forming a second engaging section, the first engaging section of the light guide section being engaged with the second engaging section of the light scattering section.

19. The method for manufacturing a backlighting device according to claim 17, wherein the step of forming the light guide section comprises forming a rib on the at least one side face for supporting a substantially perpendicular corner formed between the at least one side face and the light scattering section.

20. The backlighting device of claim 1, wherein said light scattering section protrudes from said at least one side face of said light guide unit at an angle of from about 85–88 degrees.

21. A backlighting device comprising:
    a light guide unit formed as a substantially flat panel of a first resin material having opposing major surfaces and side faces, the light guide unit having a light guide section, wherein light enters the light guide unit through at least one of the side faces and is emitted from at least one of the opposing major surfaces;
    a light source element disposed adjacent to the at least one side face of the light guide section for irradiating light onto the at least one side face of the light guide section;
    wherein the light guide unit further includes a light scattering section comprising a second resin material, the light scattering section substantially perpendicularly protruding from the at least one side face of the light guide unit, and wherein the light scattering section overlies the light source element so as to scatter the light irradiated by the light source element;
    wherein the light guide unit and the light scattering section are integrally formed by injection molding, the first and second resin materials being different from one another;
    wherein the first resin material comprised in the light guide section after molding has a first contraction ratio and the second resin material comprised in the light scattering section after molding has a second contraction ratio, the first and second contraction ratios being different from one another; and
    wherein a rate of shrinkage of the light scattering section at an interval from immediate start of resin-forming to set of resin-hardening is greater than a rate of shrinkage of the light guide unit.

22. A backlighting device comprising:
    a light guide unit formed as a substantially flat panel of a first resin material having opposing major surfaces and side faces, the light guide unit having a light guide section, wherein light enters the light guide unit through at least one of the side faces and is emitted from at least one of the opposing major surfaces;
    a light source element disposed adjacent to the at least one side face of the light guide section for irradiating light onto the at least one side face of the light guide section;
    wherein the light guide unit further includes a light scattering section comprising a second resin material, the light scattering section substantially perpendicularly protruding from the at least one side face of the light guide unit, and wherein the light scattering section overlies the light source element so as to scatter the light irradiated by the light source element; and
    a rib on the at least one side face of the light guide section irradiated by the light from the light source element, said rib supporting a substantially perpendicular corner formed between the at least one side face and the light scattering section, wherein said rib comprises the first resin.

23. The backlight device of claim 1, wherein said light scattering section comprises from 2–5% $TiO_2$.

* * * * *